(12) United States Patent
Hisamitsu

(10) Patent No.: US 9,417,365 B2
(45) Date of Patent: Aug. 16, 2016

(54) OPTICAL REFLECTIVE FILM AND OPTICAL REFLECTOR USING THE SAME

(71) Applicant: Konica Minolta, Inc., Tokyo (JP)

(72) Inventor: Akihito Hisamitsu, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 369 days.

(21) Appl. No.: 14/354,774

(22) PCT Filed: Oct. 30, 2012

(86) PCT No.: PCT/JP2012/078029
§ 371 (c)(1),
(2) Date: Apr. 28, 2014

(87) PCT Pub. No.: WO2013/065679
PCT Pub. Date: May 10, 2013

(65) Prior Publication Data
US 2014/0285896 A1    Sep. 25, 2014

(30) Foreign Application Priority Data
Oct. 31, 2011    (JP) .................................. 2011-239568

(51) Int. Cl.
*G02B 5/08* (2006.01)
*C09D 5/33* (2006.01)
*G02B 5/26* (2006.01)

(52) U.S. Cl.
CPC .............. *G02B 5/0816* (2013.01); *C09D 5/004* (2013.01); *G02B 5/0841* (2013.01); *G02B 5/26* (2013.01)

(58) Field of Classification Search
CPC .......... G02B 5/282; G02B 1/04; G02B 5/208; G02B 5/287
See application file for complete search history.

(56) References Cited

U.S. PATENT DOCUMENTS

| | | | |
|---|---|---|---|
| 5,858,526 A | 1/1999 | Floch et al. | |
| 2001/0022982 A1 | 9/2001 | Neavin et al. | |
| 2010/0208349 A1 | 8/2010 | Beer et al. | |
| 2010/0309414 A1* | 12/2010 | Tomonaga | G02B 5/3041 349/96 |
| 2013/0114132 A1* | 5/2013 | Nakajima | G02B 5/208 359/359 |
| 2013/0215501 A1* | 8/2013 | Hisamitsu | B05D 5/06 359/360 |

FOREIGN PATENT DOCUMENTS

| | | |
|---|---|---|
| JP | 04-95901 A | 3/1992 |
| JP | 08-110401 | 4/1996 |
| JP | 2002509270 A | 1/2001 |
| JP | 2004-123766 A | 4/2004 |
| JP | 3628692 | 12/2004 |
| JP | 2009-86659 A | 4/2009 |
| JP | 2009544491 A | 12/2009 |
| WO | WO2012/014654 A1 | 2/2012 |
| WO | WO2012/161096 A1 | 11/2012 |

OTHER PUBLICATIONS

Notice of Reasons for Refusal; Patent Application No. 2013-541781; Dispatch Date: Feb. 23, 2016; Date of Drafting: Feb. 10, 2016; total of 4 pages. English translation of Notice of Reasons for Refusal; total of 3 pages; Grand Total of 7 pages.
Document Online, "MOWIOL", Publisher: Clariant GmbH, Division CP; total of 105 pages, Dec. 1999.
Document Online, "MOWIOL", Publisher: Kuraray, Specialised in Specialities, Kuraray Europe GmbH, Division PVA-PVB (www.kuraray-pva-pvb.eu); Technical data sheet; Characteristics: Polyvinyl alcohol (PVA) grades with varying degrees of polymerization and hydrolysis; total of 4 pages, Jun. 2010.
IPRP and Written Opinion in Japanese and English. International Appliction No. PCT/JP2012/078029. Date of Issuance: May 6, 2014 (total of 9 pages).

* cited by examiner

*Primary Examiner* — Gregory Webb
(74) *Attorney, Agent, or Firm* — Lucas & Mercanti, LLP

(57) ABSTRACT

Provided are an optical reflective film which is a system that permits the employment of a water-based coating method in view of environmental conservation and which, even in a case where the optical reflective film is produced by simultaneous multilayer coating with high production efficiency, exhibits excellent light reflecting properties at a desired wavelength and a low haze due to the suppression of an interlaminar mixing level and interfacial disorder; and an optical reflector using the same. An optical reflective film including at least one unit obtained by laminating a high refractive index layer and a low refractive index layer on a substrate, wherein the high refractive index layer and the low refractive index layer each contain one or more of polyvinyl alcohols, and when a polyvinyl alcohol having the highest content in the high refractive index layer is referred to as a "polyvinyl alcohol (A)" and a polyvinyl alcohol having the highest content in the low refractive index layer is referred to as a "polyvinyl alcohol (B)", a degree of saponification of the polyvinyl alcohol (A) is different from a degree of saponification of the polyvinyl alcohol (B).

20 Claims, No Drawings

OPTICAL REFLECTIVE FILM AND OPTICAL REFLECTOR USING THE SAME

CROSS REFERENCE TO RELATED APPLICATION

This Application is a 371 of PCT/JP2012/078029 filed on Oct. 30, 2012 which, in turn, claimed the priority of Japanese Patent Application No. JP2011-239568 filed on Oct. 31, 2011 both applications are incorporated herein by reference.

TECHNICAL FIELD

The present invention relates to an optical reflective film that can be favorably used for a metallic luster film, a visible light colored film, and a heat barrier film, and an optical reflector using the same.

BACKGROUND ART

In recent years, interest in energy conservation measures increases and development of a near-infrared light reflective film for blocking the transmission of heat rays in the sunlight from window glass of buildings and vehicles has been actively performed, because it can reduce the load on cooling installation and is effective as an energy conservation measure.

Conventionally, it has been proposed to manufacture, as a near-infrared light reflective films, a laminated film obtained by alternately laminating a high refractive index layer and a low refractive index layer, in a dry film formation method such as vapor deposition and sputtering. Further, it has been known that by adjusting the optical film thickness of the laminated film obtained by alternately laminating layers, the film can be designed to reflect visible light instead of the near-infrared light.

However, a dry film formation method has problems such as a high manufacturing cost, difficulty in area enlargement, and limitation in a heat-resistant material.

Therefore, as a manufacturing method by a coating method, a method of using a thermosetting resin (Patent Literature 1) and a method of using a UV curable resin (Patent Literature 2) are disclosed. These methods are advantageous in terms of a manufacturing cost and area enlargement, but the both methods use a large amount of an organic solvent and are not preferable in terms of environmental conservation.

In the production of near-infrared light reflecting films, there is little known example of using an aqueous coating solution using a water-soluble polymer. As it were, there is a description of spin-coating with an aqueous solution in formation of a low refractive index layer in examples of Patent Literature 3. However, the solution is not a solution to which inorganic oxide particles are added, and a high refractive index layer is formed by spin coating an organic solvent (PGMEA; Propylene Glycol Monomethyl Ether Acetate) solution containing $TiO_2$+dispersing agent+UV curable resin, which is not water-based coating. There is also a description that a high refractive index layer is formed by spin coating a water-ethanol (20:80) mixed solvent containing $ZnO_2$+polyvinyl pyrrolidone in examples of Patent Literature 4.

Meanwhile, a method of manufacturing a laminated film of two or more layers on a substrate by coating generally includes sequential coating of laminating layers one by one by coating and drying and simultaneous multilayer coating of coating plural layers simultaneously. The sequential coating includes a spin coating method, a bar coating method, blade coating, and gravure coating and has low productivity because the number of coating and drying increases in the case of creating a multilayered film such as an optical reflective film. On the other hand, the simultaneous multilayer coating includes a method using curtain coating and slide bead coating and has high productivity because plural layers can be formed simultaneously.

CITATION LIST

Patent Literature

Patent Literature 1: Japanese Patent Application Laid-Open No. 8-110401
Patent Literature 2: Japanese Patent Application Laid-Open No. 2004-123766
Patent Literature 3: Japanese Patent Application Laid-Open No. 2009-86659
Patent Literature 4: Japanese Patent No. 3628692

SUMMARY OF INVENTION

Technical Problem

However, in a coated film obtained by multilayer coating, mixing between adjacent layers and interfacial disorder (unevenness) are likely to occur. Moderate interlaminar mixing exerts favorable effects on adhesiveness and optical properties of the film in a multilayered film such as an optical reflective film, but too large interlaminar mixing is not preferable, because reduction in reflectivity occurs and therefore the interlaminar mixing needs to be suppressed to an appropriate level. Also, large interfacial disorder causes a haze and thus is not preferable.

The present invention has been made in view of the above described circumstances, an object of the present invention is to provide an optical reflective film which is a system that permits the employment of a water-based coating method in view of environmental conservation and which, even in a case wherein the optical reflective film is produced by simultaneous multilayer coating with high production efficiency, exhibits excellent light reflecting properties at a desired wavelength and a low haze due to the control of an interlaminar mixing level and the suppression of interfacial disorder; and an optical reflector using the same.

Solution to Problem

The present inventors intensively studied in order to solve the above described problems; as a result, it has been found that the object of the present invention is achieved by adopting the following configuration.

That is, the present invention relates to an optical reflective film including at least one unit obtained by laminating a high refractive index layer and a low refractive index layer on a substrate, wherein the high refractive index layer and the low refractive index layer each contain at least one kind of polyvinyl alcohol, and when a polyvinyl alcohol having the highest content in the high refractive index layer is referred to as a "polyvinyl alcohol (A)" and a polyvinyl alcohol having the highest content in the low refractive index layer is referred to as a "polyvinyl alcohol (B)", a degree of saponification of the polyvinyl alcohol (A) is different from a degree of saponification of the polyvinyl alcohol (B).

DESCRIPTION OF EMBODIMENTS

According to the present invention, an optical reflective film which has excellent environmental conservation in production and which exhibits high productivity, excellent light reflecting properties at a desired wavelength and a low haze; and an optical reflector using the same can be provided.

As described above, as a result of intensive studies in view of the above problem, the inventors of the present invention have found that the optical reflective film which exhibits high productivity, excellent light reflecting properties at a desired wavelength and a less haze can be realized by an optical reflective film having a low refractive index layer containing a polyvinyl alcohol (B) with a degree of saponification that is different from a degree of saponification of a polyvinyl alcohol (A) contained in a high refractive index layer, and thus achieved the present invention.

A mechanism that exerts an active effect of the configuration of the present invention described above is estimated as follows.

That is, the optical reflective film, which is a subject of the present invention, is generally produced by using respective coating solutions capable of forming a high refractive index layer and a low refractive index layer and laminating the high refractive index layer and the low refractive index layer by sequential coating or simultaneous multilayer coating of each of the coating solutions. However, in a coated film obtained by the multilayer coating, mixing between adjacent layers and interfacial disorder (unevenness) are likely to occur. In the case of sequential multilayer coating, on coating with a coating solution of an upper layer, a formed lower layer is re-dissolved, the liquid between the upper layer and the lower layer are mixed and mixing between adjacent layers and interfacial disorder (unevenness) may occur. In addition, in the coated film obtained by the simultaneous multilayer coating, mixing in adjacent layers and interfacial disorder (unevenness) more significantly occur due to overlapping of layers in an undried liquid state. In the multilayered film such as an optical reflective film, appropriate interlaminar mixing exerts favorable effects on adhesiveness and optical properties of the film but too large interlaminar mixing is not preferable because reduction in reflectivity occurs and therefore it needs to control the interlaminar mixing to an appropriate level. Further, large interfacial disorder is not preferable because it becomes a cause of a haze and thus it needs to reduce the interfacial disorder.

In contrast, in the optical reflective film according to the present invention, by having the polyvinyl alcohol (A) contained in the high refractive index layer and the polyvinyl alcohol (B) contained in the low refractive index layer and having a degree of saponification different from that of the polyvinyl alcohol (A), interlaminar mixing between the high refractive index layer and the low refractive index layer is suppressed and a preferable level of an interlaminar mixing state can be realized to thus make it possible to reduce interfacial disorder. The reason why such an effect is expressed is not clear. It has been known that compatibility of polyvinyl alcohol resins having different degrees of saponification themselves is poor. It is presumed that even if, when the high refractive index layer and the low refractive index layer are overlapped in an undried liquid state, the both layers are mixed to some extent, once water that is a solvent is vaporized in a drying process and concentrated, polyvinyl alcohol resins having different degrees of saponification are phase-separated from each other and force that tries to minimize an interfacial area of each layer works and thus interlaminar mixing is suppressed and the interfacial disorder is also reduced. It is considered that the optical reflective film of the present invention exhibits excellent light reflecting properties at a desired wavelength and a less haze by suppressing interlaminar mixing and reducing interfacial disorder as described above. However, the above described mechanism is presumption and does not limit the scope of the present invention at all.

It is presumed that in the case of adding metal oxide particle to at least one of a high refractive index layer and a low refractive index layer, the metal oxide particle binds to a polyvinyl alcohol and when polyvinyl alcohol resins with different degrees of saponification are phase-separated from each other, the metal oxide particle is also transferred together, and thus the effect of the present invention can be further enhanced.

The details of the best mode for carrying out the present invention are explained hereinbelow.

[Polyvinyl Alcohol]

The optical reflective film of the present invention contains two types of polyvinyl alcohols with different degrees of saponification in a high refractive index layer and a low refractive index layer. Herein, the degree of saponification means a proportion of hydroxyl groups with respect to the total number of acetyloxy groups (derived from vinyl acetate being the raw material) and the hydroxyl groups in a polyvinyl alcohol.

A polyvinyl alcohol of which a difference in the degree of saponification is compared in each refractive index layer is a polyvinyl alcohol having the highest content in the refractive index layer when each refractive index layer includes a plurality of polyvinyl alcohols (having different degrees of saponification and polymerization degrees). Herein, when the "polyvinyl alcohol having the highest content in a refractive index layer" is referred, a polyvinyl alcohol having a difference in the degree of saponification within 3% by mol is regarded as an identical polyvinyl alcohol and a polymerization degree is calculated. However, a polyvinyl alcohol having a low polymerization degree of 1000 or less is regarded as a different polyvinyl alcohol (even if there is a polyvinyl alcohol having a difference in the degree of saponification within 3% by mol, it is not regarded as an identical polyvinyl alcohol). Specifically, when 10% by mass, 40% by mass and 50% by mass of polyvinyl alcohols having degrees of saponification of 90% by mol, 91% by mol, and 93% by mol respectively are included in the same layer, these three polyvinyl alcohols are regarded as identical polyvinyl alcohols, and a mixture of the three is assumed to be the polyvinyl alcohol (A) or (B). In addition, the above described "polyvinyl alcohol having a difference in the degree of saponification within 3% by mol" means that when any of polyvinyl alcohols is focused on, it suffices that a difference in the degree of saponification is within 3% by mol; for example, in the case of including vinyl alcohols having degrees of saponification of 90, 91, 92, and 94% by mol, any of the polyvinyl alcohols has a difference in the degree of saponification within 3% by mol when the vinyl alcohol having a degree of saponification of 91% by mol is focused on, and therefore these are identical polyvinyl alcohols.

Herein, in the present invention, when a polyvinyl alcohol having the highest content is composed of a plurality of polyvinyl alcohols having a difference in the degree of saponification within 3% by mol, the degree of saponification of the polyvinyl alcohol having the highest content is defined to be a sum obtained by multiplying degrees of saponification of respective polyvinyl alcohols that constitute the polyvinyl alcohol having the highest content by the content of the polyvinyl alcohol. The degree of saponification is specifically calculated as follows. When a polyvinyl alcohol having the highest content is composed of a polyvinyl alcohol (1) and a polyvinyl alcohol (2), the polyvinyl alcohol (1) (content of the polyvinyl alcohol (1) with respect to the total amount (solid content) of a refractive index layer: Wa, degree of saponification: Sa (% by mol)) and the polyvinyl alcohol (2) (content of the polyvinyl alcohol (2) with respect to the total amount (solid content) of a refractive index layer: Wb, degree of saponification: Sb (% by mol)), the degree of saponification of the polyvinyl alcohol having the highest content is as follows.

Average degree of saponification(% by mol)=
$(Sa*Wa+Sb*Wb)/(Wa+Wb)$

When different polyvinyl alcohol having a degree of saponification of higher than 3% by mol are included in the same layer, they are regarded as a mixture of different polyvinyl alcohols, and the polymerization degrees and the degrees of saponification are calculated, respectively.

For example, when PVA103:5% by mass, PVA117:25% by mass, PVA217:10% by mass, PVA220:10% by mass, PVA224:10% by mass, PVA235:20% by mass, and PVA245: 20% by mass are included, PVA having the highest content is a mixture of PVA217 to 245 (since a difference in the degree of saponification among PVA217 to 245 is within 3% by mol, these PVA are identical polyvinyl alcohols), and this mixture becomes a polyvinyl alcohol (A) or (B). Then, the mixture of PVA217 to 245 (polyvinyl alcohol (A)/(B)) has a polymerization degree of (1700×0.1+2000×0.1+2400×0.1+3500×0.2+4500×0.2)/0.7=3200 and a degree of saponification of 88% by mol.

Note that the polyvinyl alcohols (A) and (B) refer to unmodified polyvinyl alcohols.

Further, when polyvinyl alcohols (group) having the highest content are present plurally in the same content, any one of combinations of the polyvinyl alcohols (group) may have degrees of saponification corresponding to different degrees of saponification between the high refractive index layer and the low refractive index layer, which is a configuration of the present invention.

For example, in the case of having a polyvinyl alcohol (1) (degree of saponification of 98.5% by mol):20% by mass, a polyvinyl alcohol (2) (degree of saponification of 88% by mol):20% by mass, and a polyvinyl alcohol (3) (degree of saponification of 79.5% by mol):20% by mass contained in the high refractive index layer as polyvinyl alcohols (in the case that polyvinyl alcohols (group) having the highest content are present plurally in the same content), when any of the polyvinyl alcohols (1), (2) and (3) has a degree of saponification different from that of a polyvinyl alcohol (B) having the highest content, which is contained in the low refractive index layer, the case can be regarded as the configuration of the present invention.

A difference in an absolute value of the degree of saponification between the polyvinyl alcohol (A) and the polyvinyl alcohol (B) is preferably 3% by mol or more. It is more preferably 5% by mol or more. It is further preferably 8% by mol or more, and most preferably 10% by mol. Such a range of the difference is preferable because the interlaminar mixing state between the high refractive index layer and the low refractive index layer becomes in a preferable level. A larger difference in the degree of saponification between the polyvinyl alcohol (A) and the polyvinyl alcohol (B) is more preferable, but the difference is preferably 20% by mol or less from the viewpoint of solubility of a polyvinyl alcohol into water.

Degrees of saponification of the polyvinyl alcohol (A) and the polyvinyl alcohol (B) are preferably 75% by mol or more from the viewpoint of solubility into water. It is preferred that one of the polyvinyl alcohol (A) and the polyvinyl alcohol (B) has a degree of saponification of 90% by mol or more, and the other has a lower degree of saponification than that of the polyvinyl alcohol having a degree of saponification of 90% by mol or more. Interlaminar mixing is more suppressed with such a form. Furthermore, it is preferable that one of the polyvinyl alcohol (A) and the polyvinyl alcohol (B) has a degree of saponification of 90% by mol or more, and the other has a degree of saponification of 90% by mol or less, because the interlaminar mixing state between the high refractive index layer and the low refractive index layer becomes in a more preferable level and a reflectivity at a specific wavelength is improved. It is more preferred that one of the polyvinyl alcohol (A) and the polyvinyl alcohol (B) has a degree of saponification of 95% by mol or more, and the other has a degree of saponification of 90% by mol or less from the viewpoint of improvement in a reflectivity at a specific wavelength. Note that an upper limit of a degree of saponification of a polyvinyl alcohol is not particularly limited and usually less than 100% by mol, and about 99.9% by mol or less.

Further, as two types of polyvinyl alcohols having different degrees of saponification, those having a polymerization degree of 1,000 or more are preferably used, those having an average polymerization degree from 1,500 to 5,000 are particularly preferably used, and those having an average polymerization degree from 2,000 to 5,000 are further preferably used. When a polymerization degree of a polyvinyl alcohol is 1,000 or more, there is no crack in a coated film, and when it is 5000 or less, handling properties are good and operational efficiency is improved, which is thus preferred. The same applies to the followings. Further, when a polymerization degree of at least one of the polyvinyl alcohol (A) and the polyvinyl alcohol (B) is from 2000 to 5000, cracks in a coated film decrease and a reflectivity at a specific wavelength is improved, which is thus preferred. When polymerization degrees of both the polyvinyl alcohol (A) and the polyvinyl alcohol (B) are from 2000 to 5000, layers are further more separated and the effect described above is more remarkably exhibited, which is thus preferred.

Herein, the polymerization degree refers to a viscosity average polymerization degree, is measured in accordance with JIS-K6726 (1994), and is determined by the following equation from a limiting viscosity [η] (dl/g) measured in water at 30° C. after completely re-saponifying PVA and purifying.

$P=([\eta]\times 10^3/8.29)^{(1/0.62)}$  [Mathematical Formula 1]

The polyvinyl alcohol (B) included in the low refractive index layer preferably has a degree of saponification of 75% by mol or more and 90% by mol or less and a polymerization degree of 2000 or more and 5000 or less. It is preferred that the low refractive index layer include such a polyvinyl alcohol with respect that interfacial mixing is more suppressed. It is considered that this is because cracks in a coated film are less and the setting property is improved.

In the present invention, each of the polyvinyl alcohol (A) and the polyvinyl alcohol (B) is preferably contained in the range of 5.0% by mass or more, and more preferably of 10% by mass or more, with respect to the total mass of each refractive index layer. When the content is 5.0% by mass or more, an effect of suppressing interlaminar mixing and decreasing the interfacial disorder, which is an effect of the present invention, appears remarkably. Further, the contents of the polyvinyl alcohol (A) and the polyvinyl alcohol (B) are preferably 50% by mass or less, and more preferably 40% by mass or less, with respect to the total mass of each refractive index layer. When the content is 50% by mass or less, a relative content of a metal oxide becomes appropriate, and to increase a difference in refractive index between the high refractive index layer and the low refractive index layer is facilitated.

In the present invention, at least one of the refractive index layers preferably includes a low-polymerized and high-saponified polyvinyl alcohol having a polymerization degree of 100 to 1000, more preferably having a polymerization degree of 100 to 500, and a degree of saponification of 95% by mol or more (hereinafter also simply referred to as a "low-polymerized and high-saponified polyvinyl alcohol) in addition to the above described two types of polyvinyl alcohols which have different degrees of saponification. When such a low-polymerized and high-saponified polyvinyl alcohol is contained, stability of a coating solution is improved. It is more preferred that both of the refractive index layers contain the low-polymerized and high-saponified polyvinyl alcohol from the viewpoint of stability of a coating solution. A content of the low-polymerized and high-saponified polyvinyl alcohol is not particularly limited and is preferably from 0.5 to 5% by mass with respect to the total mass (solid content) of each refractive index layer. The above described effect can be more exhibited as long as the content is in such a range. Note that an upper limit of a degree of saponification of the low-polymerized and high-saponified polyvinyl alcohol is not particularly limited, and is usually less than 100% by mol and about 99.9% by mol or less.

In the present invention, any one of the high refractive index layer and the low refractive index layer preferably further includes a polyvinyl alcohol having a degree of saponification of 90% by mol or more (more preferably 95% by mol or more) other than the above described two types of polyvinyl alcohols (polyvinyl alcohol (A) and polyvinyl alcohol (B)) having different degrees of saponification. By having such a polyvinyl alcohol having a high degree of saponification contained, a coating solution is stabilized, interlaminar mixing is more suppressed, and a reflectivity is more improved. It is more preferred that both of the high refractive index layer and the low refractive index layer further include a polyvinyl alcohol having a degree of saponification of 90% by mol or more (more preferably 95% by mol or more) other than the polyvinyl alcohol (A) and the polyvinyl alcohol (B). The both contain the polyvinyl alcohol having a high degree of saponification, and thereby the above described effect is more exhibited.

As long as the effect of the present invention is not impaired, each refractive index layer may further include a modified polyvinyl alcohol that is partially modified, in addition to a general polyvinyl alcohol obtained by hydrolyzing polyvinyl acetate. By including such a modified polyvinyl alcohol, adhesiveness, water resistance, and flexibility of a film may be improved. Examples of such a modified polyvinyl alcohol include cation-modified polyvinyl alcohol, anion-modified polyvinyl alcohol, nonion-modified polyvinyl alcohol, and vinyl alcohol-based polymer.

As cation-modified polyvinyl alcohol, an example includes a polyvinyl alcohol having primary to tertiary amino groups or quaternary ammonium groups in the main chain or side chain of the above described polyvinyl alcohol as described in Japanese Patent Application Laid-Open No. 61-10483, and such a polyvinyl alcohol is obtained by saponifying a copolymer of an ethylenic unsaturated monomer having a cationic group and vinyl acetate.

Examples of an ethylenic unsaturated monomer having a cationic group include trimethyl-(2-acrylamide-2,2-dimethylethyl)ammonium chloride, trimethyl-(3-acrylamide-3,3-dimethylpropyl)ammonium chloride, N-vinylimidazole, N-vinyl-2-methylimidazole, N-(3-dimethylaminopropyl) methacrylamide, hydroxyethyltrimethyl ammonium chloride, trimethyl-(2-methacrylamidepropyl)ammonium chloride, and N-(1,1-dimethyl-3-dimethylaminopropyl) acrylamide. A ratio of a monomer containing a cation-modified group in a cation-modified polyvinyl alcohol is from 0.1 to 10% by mol, and preferably from 0.2 to 5% by mol, with respect to vinyl acetate.

Examples of an anion-modified polyvinyl alcohol include a polyvinyl alcohol having an anionic group as described in Japanese Patent Application Laid-Open No. 1-206088, a copolymer of a vinyl alcohol and a vinyl compound having a water-soluble group as described in Japanese Patent Application Laid-Open Nos. 61-237681 and 63-307979, and a modified polyvinyl alcohol having a water-soluble group as described in Japanese Patent Application Laid-Open No. 7-285265.

Examples of a nonion-modified polyvinyl alcohol include a polyvinyl alcohol derivative obtained by adding a polyalkylene oxide group to a part of a vinyl alcohol as described in Japanese Patent Application Laid-Open No. 7-9758, a block copolymer of a vinyl compound having a hydrophobic group and a vinyl alcohol as described in Japanese Patent Application Laid-Open No. 8-25795, a silanol-modified polyvinyl alcohol having a silanol group, and reactive group-modified polyvinyl alcohol having reactive groups such an acetoacetyl group, a carbonyl group and a carboxyl group.

Examples of a vinyl alcohol-based polymer include EXCEVAL (trade name: manufactured by Kuraray Co., Ltd.) and Nichigo G-polymer (trade name: manufactured by Nippon Synthetic Chemical Industry Co., Ltd.).

Modified polyvinyl alcohols may also be used in combination of two or more types, for example, different in polymerization degree or modification.

A content of a modified polyvinyl alcohol is not particularly limited, but is preferably 1 to 30% by mass with respect to the total mass (solid content) of each refractive index layer. If the content is in such a range, the above described effect is more exhibited.

In the present invention, two types of polyvinyl alcohols having different degrees of saponification are preferably contained in the range of 40% by mass or more and 100% by mass or less, and more preferably in the range of 60% by mass or more and 95% by mass or less, with respect to the total mass of all polyvinyl alcohol and modified polyvinyl alcohol in a refractive index layer. When the content is 40% by mass or more, an effect of suppressing interlaminar mixing and decreasing the interfacial disorder, which is the effect of the present invention, is remarkably exhibited. On the other hand, when the content is 95% by mass or less, stability of a coating solution is improved.

[Curing Agent]

In the present invention, it is preferable to use a curing agent. A curing agent that can be used with a polyvinyl alcohol is not particularly limited as long as it is a curing agent causing a curing reaction with a polyvinyl alcohol, and boric acid and a salt thereof are preferable. Other than boric acid and a salt thereof, a known curing agent can also be used and is generally a compound having a group capable of reacting with a polyvinyl alcohol or a compound that accelerates a reaction among different groups contained in a polyvinyl alcohol, which is suitably selected to be used. Specific examples of the curing agent include epoxy-based curing agents (such as diglycidyl ethyl ether, ethylene glycol diglycidyl ether, 1,4-butanediol diglycidyl ether, 1,6-diglycidyl cyclohexane, N,N-diglycidyl-4-glycidyloxyaniline, sorbitol polyglycidyl ether, and glycerol polyglycidyl ether), aldehyde-based curing agents (such as formaldehyde and glyoxal), active halogen-based curing agents (such as 2,4-dichloro-4-hydroxy-1,3,5-s-triazine), active vinyl-based compounds (such as 1,3,5-trisacryloyl-hexahydro-s-triazine and bisvinylsulfonylmethyl ether), aluminum alum, and borax.

Boric acid or a salt thereof means an oxygen acid having a boron atom as the central atom and a salt thereof, and specific examples include orthoboric acid, diboric acid, metaboric acid, tetraboric acid, pentaboric acid and octaboric acid, and salts thereof.

Boric acid having boron atoms and a salt thereof, as curing agents may be used singly in an aqueous solution or may be used by mixing two or more kinds. Particularly preferred is an aqueous mixed solution of boric acid and borax.

An aqueous solution of boric acid and an aqueous solution of borax can be added only in comparatively diluted aqueous solutions respectively, but by mixing both of aqueous solutions of boric acid and borax, a concentrated aqueous solution can be obtained and a coating liquid can be concentrated. In addition, there is an advantage that a pH of an aqueous solution to be added can be relatively freely controlled.

In the present invention, the use of boric acid and a salt thereof and/or borax is preferable from the viewpoint of suppressing interlaminar mixing. It is considered that in the case of using boric acid and a salt thereof and/or borax, metal oxide particle and OH group in a polyvinyl alcohol which is a water-soluble polymer form a hydrogen bond network, and as a result, interlaminar mixing of a high refractive index layer and a low refractive index layer is suppressed, and preferable shielding properties are achieved. In particular, when a setting coating process is used in which, after coating a multilayer of the high refractive index layer and the low refractive index layer by a coater, the film surface temperature of the coated film is cooled to about 15° C. once and then the film surface is dried, a more preferable effect can be expressed.

The total amount to be used of the above described curing agent is preferably 1 to 600 mg per 1 g of a polyvinyl alcohol and preferably 100 to 600 mg per 1 g of a polyvinyl alcohol.

[Resin Binder (Other Water-Soluble Polymers)]

In the present invention, each refractive index layer essentially includes a polyvinyl alcohol as a resin binder and may also include other resin binders.

A content of a resin binder is not particularly limited but is preferably from 5 to 50% by mass with respect to the total mass (solid content) of each refractive index layer.

In the present invention, a binder resin is preferably composed of a water-soluble polymer because there is no need to use an organic solvent, which is preferable in terms of environmental conservation. That is, as long as it does not impair the effect, in addition to the above described polyvinyl alcohol and modified polyvinyl alcohol, a water-soluble polymer other than the polyvinyl alcohol and the modified polyvinyl alcohol may be used as a binder resin in the present invention. The water-soluble polymer of the present invention means a water-soluble polymer having a mass of an undissolved substance within 50% by mass of the added water-soluble polymer, which is filtered off when filtered with a G2 glass filter (the maximum pore of 40 to 50 μm) after dissolving the water-soluble polymer in water to have a concentration of 0.5% by mass at a temperature at which the water-soluble polymer is most dissolved. Among such water-soluble polymers, gelatin, celluloses, thickening polysaccharides, and polymers having reactive functional groups are preferred. These water-soluble polymers may be used alone or may be used as a mixture of two or more kinds. Further, as a water-soluble polymer, a synthesized one may be used or a commercially available product may be used.

These water-soluble polymers will be explained below.

(Gelatin)

As gelatin applicable to the present invention, various kinds of gelatin that have been conventionally widely used in the field of silver halide photosensitive materials can be applied, and for example, in addition to acid-treated gelatin and alkali-treated gelatin, enzyme-treated gelatin obtained by a treatment with an enzyme in a production process and a gelatin derivative, that is, gelatin having an amino group, an imino group, a hydroxyl group, and a carboxyl group in a molecule as functional groups and modified by a treatment with a reagent having a group capable of reacting with such functional groups, may also be used. A general production method of gelatin has been well known and, for example, descriptions in T. H. James: The Theory of Photographic Process 4th ed. 1977 (Macmillan) page 55, Handbook of Scientific Photography (vol. 1) pages 72 to 75 (Maruzen Company, Limited.), Basics of photographic engineering-Silver salt photography, 119 to 124 (CORONA PUBLISHING CO., LTD.), etc. can be referred to. An example thereof can also include gelatin described in Research Disclosure Magazine, vol. 176, No. 17643 (December 1978) in section IX.

(Hardener of Gelatin)

When gelatin is used, a hardener of gelatin can also be added as needed.

As a hardener which can be used, known compounds which are generally used as hardeners of a photographic emulsion layer can be used, and examples can include organic hardeners such as vinyl sulfone compounds, urea-formalin condensates, melanin-formalin condensates, epoxy compounds, aziridine compounds, active olefins and isocyanate compounds, and inorganic polyvalent metal salts of chromium, aluminum and zirconium.

(Celluloses)

As celluloses that can be used in the present invention, water-soluble cellulose derivatives can be preferably used, and examples can include water-soluble cellulose derivatives such as carboxymethyl cellulose (cellulose carboxymethyl ether), methyl cellulose, hydroxymethyl cellulose, hydroxyethyl cellulose and hydroxypropyl cellulose, and carboxylic acid group-containing celluloses such as carboxymethyl cellulose (cellulose carboxymethyl ether) and carboxy ethyl cellulose.

(Thickening Polysaccharide)

The thickening polysaccharides usable in the present invention are not particularly limited, and examples of the thickening polysaccharides can include natural simple polysaccharides, natural composite polysaccharides, synthetic simple polysaccharides, and synthetic composite polysaccharides, which are generally known. Regarding the details of these polysaccharides, "Biochemistry Encyclopedia (the second edition) published by Tokyo Kagaku Dojin Co., Ltd.", and "Food Industry" Volume 31st (1988) page 21 and the like can be referred to.

A thickening polysaccharide referred in the present invention means a polymer of saccharides, which has a large number of hydrogen bonding groups in a molecule and is a polysaccharide provided with characteristics of a large difference between a viscosity at a low temperature and a viscosity at a high temperature due to difference in hydrogen bonding force among molecules by a temperature. The thickening polysaccharide is more preferably a polysaccharide that, when the metal oxide fine particles are added, causes viscosity increase which is supposed to be generated by hydrogen bonds with metal oxide fine particles at a low temperature, and of which the breadth is such that, by addition of the metal oxide fine particles, a viscosity at 15° C. is increased to preferably 1.0 mPa·s or more, and the thickening polysaccharide is a polysaccharide having a viscosity increase ability of more preferably 5.0 mPa·s or more, and further preferably 10.0 mPa·s or more.

As a thickening polysaccharide applicable to the present invention, examples thereof include galactan (e.g., agarose and agaropectin), galactomannoglycan (e.g., locust bean gum and guaran), xyloglucan (e.g., tamarind gum), glucomannoglycan (e.g., konjac mannan, glucomannan derived from wood and xanthan gum), galactoglucomannoglycan (e.g., glycan derived from softwood lumber), arabinogalactoglycan (e.g., glycan derived from soybean and glycan derived from microorganisms), glucorhamnoglycan (e.g., gellan gum), glycosaminoglycan (e.g., hyaluronic acid and keratan sulfate), and natural polymer polysaccharides derived from red algae such as alginic acid and alginate, agar, κ-carrageenan, λ-carrageenan, ι-carrageenan and furcelleran and from the viewpoint that dispersion stability of metal oxide fine particles coexistent in a coating solution is not allowed to decrease, polysaccharides without having a carboxylic acid group and a sulfonic acid group in the constitution unit are preferable. As such a polysaccharide, a polysaccharide that is composed only of, for example, pentose such as L-arabinose, D-ribose, 2-deoxyribose and D-xylose, or hexose such as D-glucose, D-fructose, D-mannose, D-galactose is preferable. Specifically, tamarind seed gum that is known as xyloglucan having glucose in the main chain and also in the side chain, guar gum that is known as galactomannan having mannose in the main chain and glucose in the side chain, cationized guar gum, hydroxypropylguar gum, locust bean gum, tara gum, arabinogalactan having galactose in the main chain and arabinose in the side chain can be preferably used. In the present invention, tamarind, guar gum, cationized guar gum, and hydroxypropyl guar gum are particularly preferable.

Two or more thickening polysaccharides may also be used in combination in the present invention.

(Polymers Having Reactive Functional Groups)

A water-soluble polymer applicable to the present invention includes polymers having reactive functional groups, and examples thereof include polyvinylpyrrolidones, acrylic resins such as polyacrylic acid, an acrylic acid-acrylnitrile copolymer, a potassium acrylate-acrylnitrile copolymer, a vinyl acetate-acrylic acid ester copolymer, or an acrylic acid-acrylic acid ester copolymer, styrene acrylic acid resins such as a styrene-acrylic acid copolymer, a styrene-methacrylic acid copolymer, a styrene-methacrylic acid-acrylic acid ester copolymer, a styrene-α-methylstyrene-acrylic acid copolymer, or a styrene-α-methylstyrene-acrylic acid-acrylic acid ester copolymer, a styrene-styrene sodium sulfonate copolymer, a styrene-2-hydroxyethyl acrylate copolymer, a styrene-2-hydroxyethyl acrylate-styrene potassium sulfonate copolymer, a styrene-maleic acid copolymer, a styrene-maleic anhydride copolymer, a vinyl naphthalene-acrylic acid copolymer, a vinyl naphthalene-maleic acid copolymer, and vinyl acetate copolymers such as a vinyl acetate-maleic acid ester copolymer, a vinyl acetate-crotonic acid copolymer, and a vinyl acetate-acrylic acid copolymer, and salts thereof.

[Metal Oxide]

The high refractive index layer and/or the low refractive index layer according to the present invention desirably contain a metal oxide particle.

(Metal Oxide in Low Refractive Index Layer)

Silica (silicon dioxide) is preferably used as a metal oxide in a low refractive index layer, and specific examples thereof include synthetic amorphous silica and colloidal silica. Among these, an acidic colloidal silica sol is preferably used, and colloidal silica is particularly preferably used. As a metal oxide fine particle in a low refractive index layer, a hollow fine particle having holes inside the particle can be used in order to further decrease a refractive index, and in particular, a hollow fine particle of silica (silicon dioxide) are preferred. Additionally, known metal oxide particles other than silica can also be used.

Metal oxide particle (preferably silicon dioxide) included in the low refractive index layer preferably has an average particle diameter from 3 to 100 nm. An average particle diameter of a primary particle of silicon dioxide dispersed in the state of primary particles (particle diameter in the state of a dispersion liquid before coating) is more preferably from 3 to 50 nm, further preferably from 3 to 40 nm, particularly preferably from 3 to 20 nm, and most preferably from 4 to 10 nm. Furthermore, an average particle diameter of secondary particles is preferably 30 nm or less from the viewpoints of a less haze and excellent visible light transmittance.

In the present specification, the average primary particle diameter can be measured from an electron micrograph by a transmission electron microscope (TEM), or the like. It may be also measured by a particle size distribution analyzer, or the like, using dynamic light scattering or static light scattering.

When determined by a transmission electron microscope, an average primary particle diameter of particle is determined by observing particles themselves or particles that appear in a cross-sectional surface or a surface of a refractive index layer with an electron microscope and measuring particle diameters of any 1000 particles to determine as a simple average value of the particle diameters (number average). Herein, a particle diameter of each particle indicates a diameter when assumed to be a circle equal to its projected area.

In addition, a particle diameter of metal oxide particle in the low refractive index layer can also be determined from a volume average particle diameter other than an average primary particle diameter.

Colloidal silica used in the present invention is obtained by heating and aging a silica sol that is obtained by undergoing double decomposition with an acid of sodium silicate, or the like, and passing through an ion exchange resin layer, and examples include colloidal silica described in Japanese Patent Application Laid-Open No. 57-14091, Japanese Patent Application Laid-Open No. 60-219083, Japanese Patent Application Laid-Open No. 60-219084, Japanese Patent Application Laid-Open No. 61-20792, Japanese Patent Application Laid-Open No. 61-188183, Japanese Patent Application Laid-Open No. 63-17807, Japanese Patent Application Laid-Open No. 4-93284, Japanese Patent Application Laid-Open No. 5-278324, Japanese Patent Application Laid-Open No. 6-92011, Japanese Patent Application Laid-Open No. 6-183134, Japanese Patent Application Laid-Open No. 6-297830, Japanese Patent Application Laid-Open No. 7-81214, Japanese Patent Application Laid-Open No. 7-101142, Japanese Patent Application Laid-Open No. 7-179029, Japanese Patent Application Laid-Open No. 7-137431, WO No. 94/26530, and the like.

For such colloidal silica, synthesized one may be used or a commercially available one may be used.

Colloidal silica may be one that is cation-modified on its surface or may be one that is treated with Al, Ca, Mg, Ba, or the like.

In addition, as a metal oxide particle in the low refractive index layer, a hollow particle can also be used. When hollow fine particle is used, an average particle hole diameter is preferably from 3 to 70 nm, more preferably from 5 to 50 nm, and further preferably from 5 to 45 nm. Note that the average particle hole diameter of hollow fine particle means an average value of internal diameters of the hollow fine particle. When the average particle hole diameter of hollow fine particle is in the above described range, the refractive index of the low refractive index layer can be sufficiently made low. The average particle hole diameter can be obtained by randomly observing 50 or more hole diameters that can be observed as a circle or an oval, or substantially a circle or an oval, by electron microscopic observation and determining hole diameters of respective particles to determine a number average value of the hole diameters. Note that the average particle hole diameter means the minimum distance among distances obtained by sandwiching outer edges of a hole diameter that can be observed as a circle or an oval, or substantially a circle or an oval, with two parallel lines.

The content of metal oxide particle in the low refractive index layer is preferably from 20 to 90% by mass, more preferably from 30 to 85% by mass, and further preferably from 40 to 70% by mass, with respect to 100% by mass of the solid content of the low refractive index layer. The content of 20% by mass or more is preferable because a desired refractive index can be obtained, and the content of 90% by mass or less is preferable because coating properties become favorable.

(Metal Oxide in High Refractive Index Layer)

The metal oxide particle in the high refractive index layer according to the present invention includes, for example, titanium dioxide, zirconium oxide, zinc oxide, alumina, colloidal alumina, zinc titanate, red lead, chrome yellow, zinc chromate, chromium oxide, ferric oxide, iron black, copper oxide, magnesium oxide, magnesium hydroxide, strontium titanate, yttrium oxide, niobium oxide, europium oxide, lanthanum oxide, zircon, tin oxide, and the like.

In the present invention, in order to form a high refractive index layer that is transparent and has a higher refractive index, the high refractive index layer preferably contains a high refractive index metal oxide fine particle of titanium oxide, zirconia, or the like, that is, a titanium oxide fine particle, a zirconia fine particle. In such a case, a rutile type (tetragonal) titanium oxide particle having a volume average particle diameter of 100 nm or less is preferably contained.

As the titanium oxide particles according to the present invention, titanium oxide particles obtained by modifying a surface of an aqueous titanium oxide sol to stabilize the dispersion state are preferably used.

As a preparation method of an aqueous titanium oxide sol, any conventionally known methods can be used and methods described in, for example, Japanese Patent Application Laid-Open No. 63-17221, Japanese Patent Application Laid-Open No. 7-819, Japanese Patent Application Laid-Open No. 9-165218, Japanese Patent Application Laid-Open No. 11-43327, Japanese Patent Application Laid-Open No. 63-17221, Japanese Patent Application Laid-Open No. 7-819, Japanese Patent Application Laid-Open No. 9-165218, and Japanese Patent Application Laid-Open No. 11-43327 can be referred to.

In addition, regarding other preparation methods of titanium oxide particle, for example, "Titanium Oxide-Physical Properties And Application Techniques" by Manabu Seino, pp 255 to 258 (2000) GIHODO SHUPPAN Co., Ltd. and the method of step (2) described in paragraphs from 0011 to 0023 in the pamphlet of WO 2007/039953 can be referred to.

The production method in step (2) described above includes step (1) of treating titanium dioxide hydrate with at least one basic compound selected from the group consisting of hydroxides of alkali metals or hydroxides of alkali earth metals and step (2) of treating the obtained titanium dioxide dispersion with a carboxylic acid group-containing compound and an inorganic acid after step (1).

Furthermore, as other production methods of metal oxide particle including titanium oxide particle, those described in Japanese Patent Application Laid-Open No. 2000-053421 (titanium oxide sol obtained by blending alkyl silicate as a dispersion stabilizer and having a weight ratio ($SiO_2/TiO_2$) of an amount of converting silica in the alkyl silicate into $SiO_2$ to an amount converting titanium in titanium oxide into $TiO_2$ of 0.7 to 10), Japanese Patent Application Laid-Open No. 2000-063119 (sol having complex colloidal particles of $TiO_2$—$ZrO_2$—SnO as the nucleus and having a surfaces thereof coated with complex oxide colloidal particles of $WO_3$—$SnO_2$—$SiO_2$), and the like can be referred to.

Furthermore, titanium oxide particles may also be coated with silicon-containing hydrous oxide. Herein, "coat" means such a state that silicon-containing hydrous oxide is attached to at least a part of surfaces of titanium oxide particles. That is, surfaces of titanium oxide particle used as metal oxide particles in the high refractive index layer may be completely coated with silicon-containing hydrous oxide or apart of surfaces of titanium oxide particle may be coated with silicon-containing hydrous oxide. It is preferred that a part of surfaces of titanium oxide particle be coated with silicon-containing hydrous oxide from the viewpoint that the refractive index of the coated titanium oxide particle is controlled by the coating amount of the silicon-containing hydrous oxide.

Titanium oxide of titanium oxide particle coated with silicon-containing hydrous oxide may be a rutile type or an anatase type. Titanium oxide particle coated with silicon-containing hydrous oxide is preferably rutile type titanium oxide particle coated with silicon-containing hydrous oxide. This is because, since rutile type titanium oxide particle has less photocatalyst activity than anatase type titanium oxide particle, weather resistance of the high refractive index layer and the adjacent low refractive index layer becomes high and refractive indices further increase.

The "silicon-containing hydrous oxide" in the present specification may be any of a hydrate of an inorganic silicon compound, and a hydrolyzate and/or a condensate of an organic silicon compound, and more preferably has a silanol group in order to attain the effect of the present invention.

A coating amount of silicon-containing hydrous oxide is from 3 to 30% by mass, preferably from 3 to 10% by mass, and more preferably from 3 to 8% by mass. This is because, when the coating amount is 30% by mass or less, a desired refractive index in the high refractive index layer can be obtained, and when the coating amount is 3% or more, particles can be stably formed.

As a method of coating titanium oxide particle with silicon-containing hydrous oxide, the coated titanium oxide particle can be produced by a conventionally known method; for example, those described in the following can be referred to; Japanese Patent Application Laid-Open No. 10-158015 (a method of producing a titanium oxide sol by performing a Si/Al hydrous oxide treatment on rutile type titanium oxide; after deflocculation of a titanic acid cake in an alkali region, causing hydrous oxide of silicon and/or aluminum to be deposited on the surface of the titanium oxide to be surface-treated), Japanese Patent Application Laid-Open No. 2000-204301 (a sol obtained by coating a rutile type titanium oxide with a complex oxide of Si and Zr and/or Al. Hydrothermal treatment.), Japanese Patent Application Laid-Open No. 2007-246351 (a method of producing a titanium oxide hydrosol coated with a hydrous oxide of silicon by adding to a hydrosol of titanium oxide obtained by deflocculation of hydrous titanium oxide, a compound having complexation action to organoalkoxysilane or titanium oxide, expressed by the formula: $R^1{}_nSiX_{4-n}$ (wherein $R^1$ is a $C_1$-$C_8$ alkyl group, a glycidyloxy-substituted $C_1$-$C_8$ alkyl group or a $C_2$-$C_8$ alkenyl group, X is an alkoxy group, and n is 1 or 2) as a stabilizer, adding to a solution of sodium silicate or silica sol in an alkali region, adjusting a pH and aging), etc.

Metal oxide particles used in the high refractive index layer can be obtained by a volume average particle diameter or an average primary particle diameter. A volume average particle diameter of metal oxide particles used in the high refractive index layer is preferably 30 nm or less, more preferably from 1 to 30 nm, and further preferably from 5 to 15 nm. The volume average particle diameter of 30 nm or less is preferable from the viewpoints of a less haze and excellent visible light transmittance. Herein, in the case of the titanium oxide particle coated with silicon-containing hydrous oxide as described above, the average primary particle diameter indicates an average primary particle diameter of titanium oxide particle (which are not coated with silicon-containing hydrous oxide). In addition, an average primary particle diameter of metal oxide particle used in the high refractive index layer is preferably 30 nm or less, more preferably from 1 to 30 nm, and further preferably from 5 to 15 nm. The average primary particle diameter of 1 nm or more and 30 nm or less is preferable from the viewpoints of a less haze and excellent visible light transmittance.

In terms of the volume average particle diameter referred in the present specification, particle diameters of any 1,000 particles are measured by a method of observing particles themselves with a laser diffraction-scattering method, a dynamic light scattering method, or an electron microscope or a method of observing a particle image that appears in a cross-sectional surface or a surface of a refractive index layer by an electron microscope, and when a volume per one particle is assumed to be vi, an average particle diameter weighted by a volume, which is expressed by a volume average particle diameter $mv=\{\Sigma(vi \cdot di)\}/\{\Sigma(vi)\}$, is calculated in a group of metal oxide particles in which particles each having a particle diameter of d1, d2 . . . di . . . dk are present respectively in the number of n1, n2 . . . ni . . . nk.

Further, a metal oxide particle used in the present invention is preferably monodispersion. Monodispersion referred herein means that a degree of monodispersion obtained in the formula described below is 40% or less. This degree of monodispersion is further preferably 30% or less, and particularly preferably 0.1 to 20%.

Degree of monodispersion=(standard deviation of particle diameter)/(average value of particle diameter)×100　　　　[Mathematical Formula 2]

A content of metal oxide particle in the high refractive index layer is preferably from 15 to 90% by mass, more preferably from 20 to 85% by mass, and further preferably from 30 to 70% by mass with respect to 100% by mass of the solid content of the high refractive index layer from the viewpoint of near-infrared shielding.

(Emulsion Resin)

A high refractive index layer or a low refractive index layer may further contain an emulsion resin. By including an emulsion resin, flexibility of a film is increased and processability such as adhesion to glass is improved.

An emulsion resin means a resin in which fine resin particles, for example, resin particles having an average particle diameter of about 0.01 to about 2.0 μm are dispersed in an aqueous medium in an emulsion state, and which is obtained by emulsion polymerization of an oil-soluble monomer using a polymer dispersing agent having a hydroxyl group. Basic difference in polymer components in the obtained emulsion resin is not found depending on a type of a dispersing agent to be used. As a dispersing agent used in polymerization of an emulsion, examples thereof include polymer dispersing agents such as polyoxyethylenenonylphenyl ether, polyoxyethylene lauric acid ether, hydroxyethyl cellulose, and polyvinylpyrrolidone, in addition to low molecular weight-dispersing agents such as an alkyl sulfonic acid salt, an alkylbenzene sulfonic acid salt, diethylamine, ethylenediamine, and a quaternary ammonium salt. When emulsion polymerization is performed using a polymer dispersing agent having a hydroxyl group, existence of a hydroxyl group is presumed at least on a surface of fine particles, and the emulsion resin has different chemical and physical properties of an emulsion from an emulsion resin that is polymerized using another dispersing agent.

The polymer dispersing agent including a hydroxyl group is a dispersing agent having a weight average molecular weight of 10000 or more, in which a hydroxyl group is substituted with the side chain or the end, and examples include one in which 2-ethylhexyl acrylate is copolymerized with acrylic polymers such as sodium polyacrylate and polyacrylic amide, and polyethers such as polyethylene glycol and polypropylene glycol, and polyvinyl alcohol, and polyvinyl alcohol is particularly preferable.

A polyvinyl alcohol used as a polymer dispersing agent includes modified polyvinyl alcohols such as a cation-modified polyvinyl alcohol, an anion-modified polyvinyl alcohol having an anionic group such as a carboxyl group, and a silyl-modified polyvinyl alcohol having a silyl group, in addition to general polyvinyl alcohols obtained by hydrolysis of polyvinyl acetate. Polyvinyl alcohol having a higher average polymerization degree has a larger effect of suppressing generation of cracks when an ink absorbing layer is formed, and when the average polymerization degree is within 5000, a viscosity of an emulsion resin is not high and handling during production is easy. Therefore, the average polymerization degree is preferably from 300 to 5000, more preferably from 1500 to 5000, and particularly preferably from 3000 to 4500. A degree of saponification of a polyvinyl alcohol is preferably from 70 to 100% by mol, and more preferably from 80 to 99.5% by mol.

As a resin that is emulsion-polymerized with the above described polymer dispersing agent, homopolymers or copolymers of ethylenic monomers such as acrylic acid ester, methacrylic acid ester, a viny-based compound and a styrene-based compound, and diene-based compounds such as butadiene and isoprene are included, and examples thereof include acrylic resins, styrene-butadiene-based resins, ethylene-vinyl acetate-based resins.

[Other Additives of Refractive Index Layer]

Various additives can be contained, if necessary, in the high refractive index layer and the low refractive index layer according to the present invention.

The high refractive index layer and the low refractive index layer can contains various known additives, for example, ultraviolet absorbents described in Japanese Patent Application Laid-Open Nos. 57-74193, 57-87988 and 62-261476, fading inhibitors described in Japanese Patent Application Laid-Open Nos. 57-74192, 57-87989, 60-72785 and 61-146591, Japanese Patent Application Laid-Open Nos. 1-95091 and 3-13376, various anionic, cationic and nonionic surfactants, a fluorescent brightener described in Japanese Patent Application Laid-Open Nos. 59-42993, 59-52689, 62-280069, 61-242871 and Japanese Patent Application Laid-Open No. 4-219266, pH adjusting agents such as sulfuric acid, phosphoric acid, acetic acid, citric acid, sodium hydroxide, potassium hydroxide and potassium carbonate, an antifoaming agent, a lubricant such as diethylene glycol, an antiseptic agent, an antistatic agent, and a mat agent.

In particular, the refractive index layers preferably contain a surfactant as an additive from the viewpoint of coating properties. In terms of an adding amount of a surfactant, a content of a surfactant in the refractive index layer is preferably from 0.001 to 0.1% by mass, and more preferably from 0.005 to 0.05% by mass, as a solid content with respect to the total mass of a coating solution of the refractive index layer.

[Method of Producing Optical Reflective Film]

A method of producing the optical reflective film of the present invention is not particularly limited, and any methods can be used as long as at least one unit constituted with a high refractive index layer and a low refractive index layer can be formed on a substrate.

In the method of producing the optical reflective film of the present invention, one unit constituted with a high refractive index layer and a low refractive index layer are laminated to be formed on a substrate and, specifically, it is preferred to perform simultaneous multilayer coating of a high refractive index layer coating solution and a low refractive index layer coating solution, and then dry to form a laminated article. This is because, in the case of simultaneous multilayer coating, since layers are overlapped in the state of undried liquid and interlaminar mixing and the like thus easily occur as described above, the effect of the present invention is more exhibited. Then, since interfacial mixing easily occurs more severely in the case of simultaneous multilayer coating as described above, the effect of the present invention is easily more exhibited in the case of production in simultaneous multilayer coating.

As a coating method, for example, a roll coating method, a rod bar coating method, an air knife coating method, a spray coating method, a curtain coating method; or a slide bead coating method and an extrusion coating method using a hopper, which are described in U.S. Pat. Nos. 2,761,419 and 2,761,791 are preferably used.

A solvent for preparation of a high refractive index layer coating solution and a low refractive index layer coating solution is not particularly limited, and water, an organic solvent or a mixed solvent thereof is preferable. In the present invention, an aqueous solvent can be used because a polyvinyl alcohol is mainly used as a resin binder. An aqueous solvent is preferable from the viewpoints of productivity and also environmental conservation because a large-scale manufacturing facility is not required as compared to the case of using an organic solvent.

As the organic solvent, examples thereof include alcohols such as methanol, ethanol, 2-propanol and 1-butanol, esters such as ethyl acetate, butyl acetate, propylene glycol monomethyl ether acetate and propylene glycol monoethyl ether acetate, ethers such as diethyl ether, propylene glycol monomethyl ether and ethylene glycol monoethyl ether, amides such as dimethylformamide and N-methylpyrrolidone, and ketones such as acetone, methyl ethyl ketone, acetyl acetone and cyclohexanone. These organic solvents may be used solely or mixing two or more. From the viewpoints of environments, simplicity of operation, and the like, a solvent of a coating solution is particularly water, or a mixed solvent of water with methanol, ethanol or ethyl acetate is preferable, and water is more preferable.

In the case of using a mixed solvent of water with a small amount of an organic solvent, the content of water in the mixed solvent is preferably from 80 to 99.9% by mass, and more preferably from 90 to 99.5% by mass when the whole mixed solvent is assumed to be 100% by mass. This is because when the content of water is 80% by mass or more, variation in a volume due to volatilization of a solvent can be reduced and handling is improved, and when the content of water is 99.9% by mass or less, homogeneity at the time of addition of a liquid is increased and stable liquid physical properties can be attained.

A concentration of a resin binder in a high refractive index layer coating solution is preferably from 0.5 to 10% by mass. In addition, a concentration of metal oxide particle in a high refractive index layer coating solution is preferably from 1 to 50% by mass.

A concentration of a resin binder in a low refractive index layer coating solution is preferably from 0.5 to 10% by mass. In addition, a concentration of metal oxide particle in a low refractive index layer coating solution is preferably from 1 to 50% by mass.

A method for preparing a high refractive index layer coating solution and a low refractive index layer coating solution is not particularly limited, and an example includes a method of adding a metal oxide particle, a resin binder, and other additives that are added according to necessity and stirring to be mixed. In this case, the order of addition of respective components is not particularly limited, and respective components may be sequentially added and mixed with stirring, or the components may be added at once with stirring. A solvent is further used if necessary, and a solution is prepared to have an appropriate viscosity.

It is preferred in the present invention that a high refractive index layer be formed using an aqueous high refractive index layer coating solution prepared by adding and dispersing a rutile type titanium oxide having a volume average particle diameter of 100 nm or less.

A temperature of a high refractive index layer coating solution and a low refractive index layer coating solution when simultaneous multilayer coating is carried out is preferably the temperature range from 25 to 60° C., and more preferably the temperature range from 30 to 45° C. in the case of using a slide bead coating method. Further, in the case of using a curtain coating method, the temperature is preferably the temperature range from 25 to 60° C., and more preferably from 30 to 45° C.

A viscosity of a high refractive index layer coating solution and a low refractive index layer coating solution when simultaneous multilayer coating is carried out is not particularly limited. However, in the case of using a slide bead coating method, the viscosity in the above described preferable temperature range of a coating solution is preferably in the range from 5 to 100 mPa·s, and further preferably in the range from 10 to 50 mPa·s. Further, in the case of using a curtain coating method, the viscosity in the above described preferable temperature range of a coating solution is preferably in the range from 5 to 1200 mPa·s, and further preferably in the range from 25 to 500 mPa·s. When the viscosity is in such a range, simultaneous multilayer coating can be efficiently carried out.

In addition, a viscosity of a coating solution at 15° C. is preferably 100 mPa·s or more, more preferably from 100 to 30,000 mPa·s, further preferably from 3,000 to 30,000 mPa·s, and most preferably from 10,000 to 30,000 mPa·s.

A method of coating and drying is preferably carried out by warming a high refractive index layer coating solution and a low refractive index layer coating solution to 30° C. or more and coating, then cooling a temperature of a formed coated film to 1 to 15° C. once and drying at 10° C. or more, and more preferably carried out under the conditions of a wet-bulb temperature in the range from 5 to 50° C. and a film surface temperature in the range from 10 to 50° C. as the drying condition. In addition, a method of cooling immediately after coating is preferably performed in a horizontal setting method from the viewpoint of uniformity of a formed coated film.

[Substrate]

Various resin films can be used as a substrate of an optical reflective film, and a polyolefin film (such as polyethylene and polypropylene), a polyester film (such as polyethylene terephthalate and polyethylene naphthalate), polyvinyl chloride, cellulose triacetate, and the like can be used, and a polyester film is preferable. A polyester film (hereinafter referred to as polyester) is not particularly limited, and is preferably polyester having a film formation property with main constituents of a dicarboxylic acid component and a diol component.

Examples of the dicarboxylic acid component that is a main constituent can include terephthalic acid, isophthalic acid, phthalic acid, 2,6-naphthalene dicarboxylic acid, 2,7-naphthalene dicarboxylic acid, diphenylsulfone dicarboxylic acid, diphenyl ether dicarboxylic acid, diphenylethane dicarboxylic acid, cyclohexane dicarboxylic acid, diphenyl dicarboxylic acid, diphenylthioether dicarboxylic acid, diphenyl ketone dicarboxylic acid, and phenylindane dicarboxylic acid. Further, examples of the diol component can include ethylene glycol, propylene glycol, tetramethylene glycol, cyclohexane dimethanol, 2,2-bis(4-hydroxyphenyl)propane, 2,2-bis(4-hydroxyethoxyphenyl)propane, bis(4-hydroxyphenyl)sulfone, bisphenol fluorenedihydroxyethyl ether, diethylene glycol, neopentyl glycol, hydroquinone and cyclohexanediol. Among polyesters containing these compounds as main constituents, polyesters containing terephthalic acid or 2,6-naphthalene dicarboxylic acid for the dicarboxylic acid component and ethylene glycol or 1,4-cyclohexanedimethanol for the diol component as main constituents are preferable from the viewpoints of transparency, mechanical strength, size stability, and the like. In particular, polyester containing polyethylene terephthalate or polyethylene naphthalate as the main constituents, copolymerized polyester made of terephthalic acid, 2,6-naphthalene dicarboxylic acid and ethylene glycol, and polyester containing a mixture of two or more of the above described polyesters as the main constituent are preferable.

A thickness of a substrate used in the present invention is preferably from 10 to 300 µm, and particularly preferably from 20 to 150 µm. In addition, a substrate may be a material obtained by laminating two substrates, and in this case, the kinds thereof may be the same or different.

A substrate has a transmission in a visible light region indicated in JIS R3106-1998 of preferably 85% or more and particularly preferably 90% or more. It is advantageous and preferable that a substrate has the above described transmission or more because when formed into a near-infrared shielding film, the film has a transmission in a visible light region indicated in JIS R3106-1998 of 50% or more.

In addition, a substrate using the above described resin may be an unstretched film or a stretched film. A stretched film is preferable from the viewpoints of improvement in strength and suppression of thermal expansion.

A substrate can be produced by a conventionally known general method. For example, a resin, which is to be a material, is molten by an extruder and extruded by an annular die or a T die to be rapidly cooled and a substantially amorphous and unoriented substrate can be thus produced. Furthermore, a stretched substrate can be produced by stretching an unstretched substrate in a substrate-flowing direction (longitudinal direction) or a direction perpendicular to the substrate-flowing direction (horizontal direction) by a well-known method such as uniaxial stretching, tenter type sequential biaxial stretching, tenter type simultaneous biaxial stretching, and tubular simultaneous biaxial stretching. A draw ratio in this case can be suitably selected according to a resin that is a material of a substrate and is preferably from 2 to 10 times in each of the longitudinal direction and the horizontal direction.

In addition, a relaxation treatment and an off-line heat treatment may be carried out on a substrate from the viewpoint of size stability. The relaxation treatment is preferably carried out in a tenter for horizontal stretching after thermally fixing during a stretching and film formation step of the above described polyester film, or in a step from leaving the tenter until winding. The relaxation treatment is performed preferably at a treatment temperature from 80 to 200° C., and more preferably at a treatment temperature from 100 to 180° C. The relaxation treatment is also performed preferably at a relaxation ratio in the range from 0.1 to 10% in both of the longitudinal direction and the thickness-wise direction, and more preferably at a relaxation ratio of 2 to 6%. A relaxation treated substrate is improved in heat resistance by undergoing an off-line heat treatment described below and, furthermore, size stability becomes favorable.

It is preferable to coat one side or both sides of a substrate with an undercoat layer coating solution inlinely in a film formation process. Note that undercoat application during a film formation step is referred to as inline undercoat. Examples of resins used in an undercoat layer coating solution include a polyester resin, an acrylic modified polyester resin, a polyurethane resin, an acrylic resin, a vinyl resin, a vinylidene chloride resin, a polyethylene iminevinylidene resin, a polyethyleneimine resin, a polyvinyl alcohol resin, a modified polyvinyl alcohol resin and gelatin, all of which can be preferably used. Conventionally known additives can also be added to these undercoat layers. Then, coating of the above described undercoat layer can be performed in a known method such as roll coat, gravure coat, knife coat, dip coat and spray coat. A coating amount of the undercoat layer described above is preferably from about 0.01 to about 2 $g/m^2$ (dry state).

[Film Design]

The optical reflective film of the present invention includes at least one unit obtained by laminating a high refractive index layer and a low refractive index layer. The optical reflective film preferably has a multilayered optical interference film that is formed by alternately laminating a high refractive index layer and a low refractive index layer on one side or both sides of a substrate. From the viewpoint of productivity, a preferable range of the number of the total layers of a high refractive index layer and a low refractive index layer per one side of a substrate is 100 layers or less, and more preferably 45 layers or less. The lower limit of the range of the number of the total layers of a high refractive index layer and a low refractive index layer per one side of a substrate is not particularly limited, and is preferably 5 layers or more. Note that the preferable range of the number of the total layers of a high refractive index layer and a low refractive index layer as described above is applicable to the case of laminating on only one side of a substrate and also applicable to the case of laminating on both sides of a substrate. In the case of laminating on both sides of a substrate, the numbers of total layers of a high refractive index layer and a low refractive index layer on one side and the other side of a substrate may be the same or different. Further, in the optical reflective film of the present invention, an undermost layer (a layer that is brought into contact with a substrate) and an uppermost layer may be either of a high refractive index layer or a low refractive index layer. However, from the viewpoints that adhesiveness of the undermost layer to the substrate, blowing resistance of the uppermost layer, and also coating properties and adhesiveness of a hard coat layer and the like to the uppermost layer are excellent, by adopting a layer configuration in which low refractive index layers are located at the undermost layer and the uppermost layer, the optical reflective film of the present invention preferably adopts a layer configuration in which the undermost layer and the uppermost layer are low refractive index layers.

In general, in an optical reflective film, it is preferred to adopt such a design that a difference in refractive index between a high refractive index layer and a low refractive index layer becomes large, from the viewpoint that a reflectivity to a desired light ray can be increased with the less number of layers. In the present invention, a difference in refractive index between at least adjacent two layers (a high refractive index layer and a low refractive index layer) is preferably 0.1 or more, more preferably 0.25 or more, further preferably 0.3 or more, further more preferably 0.35 or more, and most preferably 0.4 or more. In addition, although the upper limit is not particularly restricted, for example, it is 1.4 or less.

The difference in refractive index and the number of necessary layers can be calculated using a commercially available optical design software. For example, in order to obtain a near-infrared reflectivity of 90% or more, when the difference in refractive index is less than 0.1, 200 layers or more are required to be laminated, and productivity is not only reduced, but also scattering in interfaces of laminated layers increases, transparency is lowered, and production without failure may be very difficult to realize.

When a high refractive index layer and a low refractive index layer are alternately laminated in an optical reflective film, a difference in refractive index between the high refractive index layer and the low refractive index layer is preferably within the range of the preferable difference in refractive index as described above. However, for example, when the uppermost layer is formed as a layer for protecting the film or when the undermost layer is formed as a layer for improving adhesiveness with a substrate, in terms of the uppermost layer and the undermost layer, such a configuration may be adopted that the difference in refractive index is out of the range of the preferable difference in refractive index as described above.

Note that the terms such as "high refractive index layer" and "low refractive index layer" in the present specification means that, when a difference in refractive index between adjacent two layers is compared, a refractive index layer having a higher refractive index is referred to as a high refractive index layer and a refractive index layer having a lower refractive index is referred to as a low refractive index layer. Therefore, the terms such as "high refractive index layer" and "low refractive index layer" include any forms except that respective refractive index layers have the same refractive index in the case of focusing on two adjacent refractive index layers in respective refractive index layers that constitute an optical reflective film.

Since reflection in an interface between adjacent layers depends on a refractive index ratio between layers, the larger this refractive index ratio is, the higher a reflectivity is. In addition, when an optical path difference between reflected light in the layer surface and reflected light in the bottom of the layer in the case of a single layer film is made in a relationship expressed by n·d=wavelength/4, the reflected light can be controlled to increase each other due to a phase difference, and a reflectivity can be thus increased. Herein, n is a refractive index, d is a physical film thickness of a layer, and n·d is an optical film thickness. Reflection can be controlled by use of this optical path. By use of this relationship, a refractive index of each layer and a film thickness are controlled, and reflection of visible light or near-infrared light is controlled. That is, a reflectivity in a specific wavelength region can be raised by a refractive index of each layer, a film thickness of each layer and the way of laminating each layer.

The optical reflective film of the present invention can be formed into a visible light reflective film or a near-infrared reflective film by changing a specific wavelength region that raises a reflectivity. That is, when the specific wavelength region that raises a reflectivity is set to a visible light region, the optical reflective film is formed into a visible light reflective film, and when the specific wavelength region is set to a near-infrared region, the optical reflective film is formed into a near-infrared reflective film. In addition, when the specific wavelength region that raises a reflectivity is set to an ultraviolet region, the optical reflective film is formed into an ultraviolet reflective film. When the optical reflective film of the present invention is used for a heat barrier film, a near-infrared reflective film may be formed. In the case of a near-infrared reflective film, a multilayered film is formed by laminating films with different refractive indices one another on a polymer film, and a transmission at 550 nm in a visible light region indicated in JIS R3106-1998 is preferably 50% or more, more preferably 70% or more, and further preferably 75% or more. In addition, a transmission at 1200 nm is preferably 30% or less, and more preferably less than 15%. It is preferred to design an optical film thickness and a unit so as to be in such a favorable range. A region at a wavelength from 900 nm to 1400 nm preferably includes a region with a reflectivity of higher than 50%.

The infrared region among incident spectra of direct solar light is related to increase of a room temperature and shielding the infrared region enables increase of a room temperature to be suppressed. According to accumulated energy ratio from the shortest wavelength (760 nm) to the longest wavelength (3200 nm) of infrared rays based on a weighting coefficient described in Japanese Industrial Standards JIS R3106, in the case of accumulated energy from 760 nm to each wavelength with the total energy of the whole infrared region from a wavelength of 760 nm to the longest wavelength of 3200 nm being as 100, the sum of energy from 760 to 1300 nm occupies about 75% of the entire infrared region. Therefore, shielding light in a wavelength region up to 1300 nm is efficient in terms of an energy conservation effect by shielding heat rays.

When a reflectivity in this near-infrared light region (760 to 1300 nm) is set to about 80% or more as the maximum peak value, decrease of a sensible temperature is obtained from a sensory evaluation. For example, a sensible temperature by a window facing to the southeast method in the morning in August showed a clear difference when a reflectivity in a near-infrared light region was shielded up to about 80% as the maximum peak value.

As a result of determining a multilayered film structure that is required for expressing such a function by optical simulation (FTG Software Associates Film DESIGN Version 2.23.3700), it is found that when a high refractive index layer having a refractive index of 1.9 or more, desirably 2.0 or more is employed and 6 layers or more are laminated, excellent properties can be obtained. For example, according to the results of a model simulation in which a high refractive index layer and a low refractive index layer (refractive index=1.35) are alternately laminated in 8 layers, when the refractive index of the high refractive index layer is 1.8, the reflectivity does not even reach 70%, but when the refractive index is 1.9, the reflectivity of about 80% can be obtained. In addition, in a model in which a high refractive index layer (refractive index=2.2) and a low refractive index layer (refractive index=1.35) are alternately laminated, when the number of laminated layers is 4, the reflectivity does not even reach 60%, but when the number of laminated layers is 6, the reflectivity of about 80% can be obtained.

The low refractive index layer preferably has a refractive index from 1.10 to 1.60, and more preferably from 1.30 to 1.50. The high refractive index layer preferably has a refractive index from 1.70 to 2.50, and more preferably from 1.80 to 2.20.

The thickness (thickness after drying) of one refractive index layer is preferably from 20 to 1000 nm, more preferably from 50 to 500 nm, and further preferably from 50 to 350 nm.

The thickness of the whole optical reflective film of the present invention is preferably from 12 μm to 315 μm, more preferably from 15 μm to 200 μm, and further preferably from 20 μm to 100 μm.

[Layer Configuration of Optical Reflective Film]

The optical reflective film may have one or more of functional layers such as a conductive layer, an antistatic layer, a gas barrier layer, an easily adhesive layer (adhesive layer), an antifouling layer, a deodorant layer, a dripping layer, an easily sliding layer, a hard coat layer, an abrasion resistant layer, an antireflection layer, an electromagnetic wave shielding layer, an ultraviolet absorbing layer, an infrared absorbing layer, a printing layer, a fluorescence emission layer, a hologram layer, a peeling layer, a cohesive layer, an adhesive layer, an infrared ray cut layer other than the above described high refractive index layer and low refractive index layer (metallic layer and liquid crystal layer), a coloring layer (visible light absorbing layer), an intermediate layer used in laminated glass, and the like, under a substrate or on the uppermost surface layer in the opposite side of the substrate for the purpose of adding further functions.

The order of lamination of the above described various functional layers in the reflective film is not particularly limited.

For example, in a mode of attaching an optical reflective film to an indoor side of window glass (pasting inside), one preferable example includes a form in which a reflective optical layer including at least one unit obtained by laminating the above described high refractive index layer and low refractive index layer, and a cohesive layer are laminated on a substrate surface in this order, and a hard coat layer is further applied on the other substrate surface opposite to the side on which these layers are laminated. In addition, the lamination may be performed in the order of a cohesive layer, a substrate, a reflective optical layer and a hard coat layer, and the optical reflective film may also have other functional layers, substrates, infrared absorbents, or the like. In addition, one preferable example of a mode of attaching the optical reflective film of the present invention to an outdoor side of window glass (pasting outside) includes a configuration in which a reflective optical layer and a cohesive layer are laminated on a substrate surface in this order and a hard coat layer is applied on the other substrate surface opposite to the side on which these layers are laminated. Similar to the case of pasting inside, the lamination may be performed in the order of a cohesive layer, a substrate, a reflective optical layer and a hard coat layer, and the optical reflective film may also have other functional layers, substrates, infrared absorbents, or the like.

[Application of Optical Reflective Film: Optical Reflector]

The optical reflective film of the present invention can be applied to the wide range of fields. For example, the optical reflective film is used for the purpose of mainly enhancing weather resistance as attachment to facility (base structure) exposed to solar light for a long time such as outside windows in buildings and automobile windows, a film for window attachment such as a heat ray reflective film that imparts an effect of heat ray reflection, a film for an agricultural plastic green house, and the like. In particular, the optical reflective film according to the present invention is favorable for a member in which the optical reflective film according to the present invention is attached directly or through an adhesive agent to a base structure such as glass or a glass substitute resin.

Specific examples of a base structure include glass, a polycarbonate resin, a polysulfone resin, an acrylic resin, a polyolefin resin, a polyether resin, a polyester resin, a polyamide resin, a polysulfide resin, an unsaturated polyester resin, an epoxy resin, a melamine resin, a phenol resin, a diallyl phthalate resin, a polyimide resin, a urethane resin, a polyvinyl acetate resin, a polyvinyl alcohol resin, a styrene resin, a vinyl chloride resin, a metallic plate, and ceramic. A type of a resin may be any of a thermoplastic resin, a thermosetting resin, and an ionizing radiation curing resin, and two types of these resins may be used in combination. A base structure can be produced by known methods such as extrusion molding, calender molding, injection molding, hollow molding, and compression molding. A thickness of a base structure is not particularly limited and is usually from 0.1 mm to 5 cm.

In terms of an adhesive layer or a cohesive layer for attaching an optical reflective film and a base structure, the optical reflective film is preferably arranged in the side of solar (heat rays) entrance surface. In addition, sandwiching the optical reflective film between window glass and the base structure is preferable because sealing from surrounding gas such as moisture can be attained and durability is thus excellent. Also arranging the near-infrared shielding film according to the present invention in the outside or exterior of an automobile (for pasting outside) is preferable because the film has environmental durability.

When an adhesive layer or a cohesive layer for attaching an optical reflective film and a base structure is attached to window glass, or the like, the optical reflective film is preferably arranged in the side of solar (heat rays) entrance surface. In addition, sandwiching the optical reflective film between window glass and the base structure is preferable in terms of durability because sealing from surrounding gas such as moisture can be attained. Also arranging the optical reflective film according to the present invention in the outside or exterior of an automobile (for pasting outside) is preferable because the film has environmental durability.

As an adhesive agent applicable to the present invention, an adhesive agent containing a photocurable or thermosetting resin as a main component can be used.

An adhesive agent having durability to ultraviolet rays is preferable, and an acrylic cohesive agent or a silicone cohesive agent is preferable. Furthermore, an acrylic cohesive agent is preferable from the viewpoints of cohesion characteristics and a cost. In particular, a solvent-based cohesive agent is preferable among solvent-based cohesive agents and emulsion-based cohesive agents in acrylic cohesive agents from the viewpoint that peeling strength is easily controlled. When a solution polymerization polymer is used as an acrylic solvent-based cohesive agent, a known monomer can be used as its monomer.

In addition, a polyvinyl butylal resin used as an intermediate layer of laminated glass, or an ethylene-vinyl acetate copolymer-based resin may also be used. Specific examples thereof include plastic polyvinyl butylal [manufactured by SEKISUI CHEMICAL CO., LTD., manufactured by Mitsubishi Monsanto Chemical Co., etc.], an ethylene-vinyl acetate copolymer [manufactured by Du Pont Kabushiki Kaisha, manufactured by Takeda Pharmaceutical Company Limited., DUMILAN], and a modified ethylene-vinyl acetate copolymer [manufactured by TOSOH CORPORATION, Melthene G]. Note that an ultraviolet absorbent, an antioxidant, an antistatic agent, a heat stabilizer, a lubricant, a filing agent, a coloration agent, and an adhesion adjusting agent, and the like may be appropriately blended to an adhesive layer.

EXAMPLES

Hereinbelow, the present invention is described specifically by referring to Examples; however, the present invention is not limited to them. Note that, in Examples, the term "part" or "%" is used, and unless particularly mentioned, this represents "part by mass" or "% by mass".

Example 1

Manufacturing of Near-Infrared Shielding Film

[Preparation of Coating Solution]
(Preparation of Low Refractive Index Layer Coating Solution L1)

To 10 parts by mass of an aqueous solution containing 3% by mass of boric acid being heated and stirred at 45° C., 80 parts by mass of an aqueous solution containing 5% by mass of polyvinyl alcohol (PVA-117H, polymerization degree of 1700, degree of saponification of 99.5% by mol, manufactured by Kuraray Co., Ltd.) was added, and then 1 part by mass of an aqueous solution containing 1% by mass of a surfactant (Rapizol A30, manufactured by NOF CORPORATION) was added, and 9 parts by mass of purified water was added to thus prepare a low refractive index layer coating solution L1.

(Preparation of Low Refractive Index Layer Coating Solution L2)

To 55 parts by mass of colloidal silica (Snowtex OXS, manufactured by Nissan Chemical Industries, Ltd., solid content of 10% by mass), 10 parts by mass of an aqueous solution containing 5% by mass of a polyoxyalkylene-based dispersing agent (Mariarim AKM-0531, manufactured by NOF Corporation) and 10 parts by mass of an aqueous solution containing 3% by mass of boric acid were respectively added and then heated to 45° C., and with stirring, 20 parts by mass of an aqueous solution containing 5% by mass of polyvinyl alcohol (PVA-117H, polymerization degree of 1700, degree of saponification of 99.5% by mol, manufactured by Kuraray Co., Ltd.) and 1 part by mass of an aqueous solution containing 1% by mass of a surfactant (Rapizol A30, manufactured by NOF CORPORATION) were added, and 4 parts by mass of purified water was added to thus prepare a low refractive index layer coating solution L2.

(Preparation of Low Refractive Index Layer Coating Solution L3)

To 55 parts by mass of colloidal silica (Snowtex OXS, manufactured by Nissan Chemical Industries, Ltd., solid content of 10% by mass), 2 parts by mass of an aqueous solution containing 5% by mass of polyvinyl alcohol (PVA-103, polymerization degree of 300, degree of saponification of 98.5% by mol, manufactured by Kuraray Co., Ltd.) and 10 parts by mass of an aqueous solution containing 3% by mass of boric acid were respectively added and then heated to 45° C., and with stirring, 20 parts by mass of an aqueous solution containing 5% by mass of polyvinyl alcohol (PVA-117H, polymerization degree of 1700, degree of saponification of 99.5% by mol, manufactured by Kuraray Co., Ltd.) and 1 part by mass of an aqueous solution containing 1% by mass of a surfactant (Rapizol A30, manufactured by NOF CORPORATION) were added, and 12 parts by mass of purified water was added to thus prepare a low refractive index layer coating solution L3.

(Preparation of Low Refractive Index Layer Coating Solution L4)

To 40 parts by mass of colloidal silica (Snowtex OXS, manufactured by Nissan Chemical Industries, Ltd., solid content of 10% by mass), 2 parts by mass of an aqueous solution containing 5% by mass of polyvinyl alcohol (PVA-103, polymerization degree of 300, degree of saponification of 98.5% by mol, manufactured by Kuraray Co., Ltd.) and 10 parts by mass of an aqueous solution containing 3% by mass of boric acid were respectively added and then heated to 45° C., and with stirring, 20 parts by mass of an aqueous solution containing 5% by mass of polyvinyl alcohol (PVA-117H, polymerization degree of 1700, degree of saponification of 99.5% by mol, manufactured by Kuraray Co., Ltd.) and 1 part by mass of an aqueous solution containing 1% by mass of a surfactant (Rapizol A30, manufactured by NOF CORPORATION) were added, and 27 parts by mass of purified water was added to thus prepare a low refractive index layer coating solution L4.

(Preparation of Low Refractive Index Layer Coating Solution L5)

To 12 parts by mass of colloidal silica (Snowtex OXS, manufactured by Nissan Chemical Industries, Ltd., solid content of 10% by mass), 2 parts by mass of an aqueous solution containing 5% by mass of polyvinyl alcohol (PVA-103, polymerization degree of 300, degree of saponification of 98.5% by mol, manufactured by Kuraray Co., Ltd.) and 10 parts by mass of an aqueous solution containing 3% by mass of boric acid were respectively added and then heated to 45° C., and with stirring, 20 parts by mass of an aqueous solution containing 5% by mass of polyvinyl alcohol (PVA-117H, polymerization degree of 1700, degree of saponification of 99.5% by mol, manufactured by Kuraray Co., Ltd.) and 1 part by mass of an aqueous solution containing 1% by mass of a surfactant (Rapizol A30, manufactured by NOF CORPORATION) were added, and 55 parts by mass of purified water was added to thus prepare a low refractive index layer coating solution L5.

(Preparation of Low Refractive Index Layer Coating Solution L6)

A low refractive index layer coating solution L6 was prepared in the same manner as the low refractive index layer coating solution L4, except for using an aqueous solution containing 5% by mass of polyvinyl alcohol (PVA-617, polymerization degree of 1700, degree of saponification of 95.0% by mol, manufactured by Kuraray Co., Ltd.) in place of the aqueous solution containing 5% by mass of polyvinyl alcohol (PVA-117H, polymerization degree of 1700, degree of saponification of 99.5% by mol, manufactured by Kuraray Co., Ltd.).

(Preparation of Low Refractive Index Layer Coating Solution L7)

A low refractive index layer coating solution L7 was prepared in the same manner as the low refractive index layer coating solution L4, except for using an aqueous solution containing 5% by mass of polyvinyl alcohol (PVA-217, polymerization degree of 1700, degree of saponification of 88.0% by mol, manufactured by Kuraray Co., Ltd.) in place of the aqueous solution containing 5% by mass of polyvinyl alcohol (PVA-117H, polymerization degree of 1700, degree of saponification of 99.5% by mol, manufactured by Kuraray Co., Ltd.).

(Preparation of Low Refractive Index Layer Coating Solution L8)

A low refractive index layer coating solution L8 was prepared in the same manner as the low refractive index layer coating solution L4, except for using an aqueous solution containing 5% by mass of polyvinyl alcohol (PVA-417, polymerization degree of 1700, degree of saponification of 79.5% by mol, manufactured by Kuraray Co., Ltd.) in place of the aqueous solution containing 5% by mass of polyvinyl alcohol (PVA-117H, polymerization degree of 1700, degree of saponification of 99.5% by mol, manufactured by Kuraray Co., Ltd.).

(Preparation of Low Refractive Index Layer Coating Solution L9)

A low refractive index layer coating solution L9 was prepared in the same manner as the low refractive index layer coating solution L4, except for using an aqueous solution containing 5% by mass of polyvinyl alcohol (PVA-117, polymerization degree of 1700, degree of saponification of 98.5% by mol, manufactured by Kuraray Co., Ltd.) in place of the aqueous solution containing 5% by mass of polyvinyl alcohol (PVA-117H, polymerization degree of 1700, degree of saponification of 99.5% by mol, manufactured by Kuraray Co., Ltd.).

(Preparation of Low Refractive Index Layer Coating Solution L10)

A low refractive index layer coating solution L10 was prepared in the same manner as the low refractive index layer coating solution L4, except for using an aqueous solution containing 5% by mass of polyvinyl alcohol (PVA-220, polymerization degree of 2000, degree of saponification of 88.0% by mol, manufactured by Kuraray Co., Ltd.) in place of the aqueous solution containing 5% by mass of polyvinyl alcohol (PVA-117H, polymerization degree of 1700, degree of saponification of 99.5% by mol, manufactured by Kuraray Co., Ltd.).

(Preparation of Low Refractive Index Layer Coating Solution L11)

A low refractive index layer coating solution L11 was prepared in the same manner as the low refractive index layer coating solution L4, except for using an aqueous solution containing 5% by mass of polyvinyl alcohol (PVA-245, polymerization degree of 4500, degree of saponification of 88.0% by mol, manufactured by Kuraray Co., Ltd.) in place of the aqueous solution containing 5% by mass of polyvinyl alcohol (PVA-117H, polymerization degree of 1700, degree of saponification of 99.5% by mol, manufactured by Kuraray Co., Ltd.).

(Preparation of Low Refractive Index Layer Coating Solution 12)

A low refractive index layer coating solution L12 was prepared in the same manner as the low refractive index layer coating solution L4, except for using an aqueous solution containing 5% by mass of polyvinyl alcohol (PVA-420, polymerization degree of 2000, degree of saponification of 79.5% by mol, manufactured by Kuraray Co., Ltd.) in place of the aqueous solution containing 5% by mass of polyvinyl alcohol (PVA-117H, polymerization degree of 1700, degree of saponification of 99.5% by mol, manufactured by Kuraray Co., Ltd.).

(Preparation of Low Refractive Index Layer Coating Solution L13)

A low refractive index layer coating solution L13 was prepared in the same manner as the low refractive index layer coating solution L4, except for using an aqueous solution containing 5% by mass of polyvinyl alcohol (PVA-235, polymerization degree of 3500, degree of saponification of 88.0% by mol, manufactured by Kuraray Co., Ltd.) in place of the aqueous solution containing 5% by mass of polyvinyl alcohol (PVA-117H, polymerization degree of 1700, degree of saponification of 99.5% by mol, manufactured by Kuraray Co., Ltd.).

(Preparation of Low Refractive Index Layer Coating Solution L14)

A low refractive index layer coating solution L14 was prepared in the same manner as the low refractive index layer coating solution L4, except for using a 4:1 mixed solution of an aqueous solution containing 5% by mass of polyvinyl alcohol (PVA-245, polymerization degree of 4500, degree of saponification of 88.0% by mol, manufactured by Kuraray Co., Ltd.) and an aqueous solution containing 5% by mass of modified polyvinyl alcohol (Z-220, polymerization degree of 1100, degree of saponification of 91.5% by mol, manufactured by The Nippon Synthetic Chemical Co., Ltd.) in place of the aqueous solution containing 5% by mass of polyvinyl alcohol (PVA-117H, polymerization degree of 1700, degree of saponification of 99.5% by mol, manufactured by Kuraray Co., Ltd.).

(Preparation of Low Refractive Index Layer Coating Solution L15)

A low refractive index layer coating solution L15 was prepared in the same manner as the low refractive index layer coating solution L1, except for using an aqueous solution containing 5% by mass of polyvinyl alcohol (PVA-117, polymerization degree of 1700, degree of saponification of 98.5% by mol, manufactured by Kuraray Co., Ltd.) in place of the aqueous solution containing 5% by mass of polyvinyl alcohol (PVA-117H, polymerization degree of 1700, degree of saponification of 99.5% by mol, manufactured by Kuraray Co., Ltd.).

(Preparation of Low Refractive Index Layer Coating Solution L16)

A low refractive index layer coating solution L16 was prepared in the same manner as the low refractive index layer coating solution L2, except for using an aqueous solution containing 5% by mass of polyvinyl alcohol (PVA-117, polymerization degree of 1700, degree of saponification of 98.5% by mol, manufactured by Kuraray Co., Ltd.) in place of the aqueous solution containing 5% by mass of polyvinyl alcohol (PVA-117H, polymerization degree of 1700, degree of saponification of 99.5% by mol, manufactured by Kuraray Co., Ltd.).

(Preparation of Low Refractive Index Layer Coating Solution L17)

A low refractive index layer coating solution L17 was prepared in the same manner as the low refractive index layer coating solution L4, except for using 20 parts by mass of an aqueous solution containing 5% by mass of polyvinyl alcohol (PVA-420, polymerization degree of 2000, degree of saponification of 79.5% by mol, manufactured by Kuraray Co., Ltd.) in place of 20 parts by mass of the aqueous solution containing 5% by mass of polyvinyl alcohol (PVA-117H, polymerization degree of 1700, degree of saponification of 99.5% by mol, manufactured by Kuraray Co., Ltd.), and further adding 5 parts by mass of an aqueous solution containing 5% by mass of polyvinyl alcohol (PVA-117, polymerization degree of 1700, degree of saponification of 98.5% by mol, manufactured by Kuraray Co., Ltd.).

(Preparation of Low Refractive Index Layer Coating Solution L18)

A low refractive index layer coating solution L18 was prepared in the same manner as the low refractive index layer coating solution L4, except for using 14 parts by mass of an aqueous solution containing 5% by mass of polyvinyl alcohol (PVA-245, polymerization degree of 4500, degree of saponification of 88.0% by mol, manufactured by Kuraray Co., Ltd.) and 6 parts by mass of an aqueous solution containing 5% by mass of polyvinyl alcohol (PVA-235, polymerization degree of 3500, degree of saponification of 88.0% by mol, manufactured by Kuraray Co., Ltd.) in place of 20 parts by mass of the aqueous solution containing 5% by mass of polyvinyl alcohol (PVA-117H, polymerization degree of 1700, a degree of saponification of 99.5% by mol, manufactured by Kuraray Co., Ltd.). Herein, PVA-245 and PVA-235 have the same degree of saponification and are therefore regarded as identical polyvinyl alcohols, and the degree of saponification is 88.0% by mol and the polymerization degree is 4200=(4500*0.14+3500*0.06)/0.2 in this case.

(Preparation of High Refractive Index Layer Coating Solution H1)

To 80 parts by mass of an aqueous solution containing 5% by mass of polyvinyl alcohol (PVA-117, polymerization degree of 1700, degree of saponification of 98.5% by mol, manufactured by Kuraray Co., Ltd.) being heated and stirred, 1 part by mass of an aqueous solution containing 1% by mass of a surfactant (Rapizol A30, manufactured by NOF CORPORATION) was added and 19 parts by mass of purified water was added to thus prepare a high refractive index layer coating solution H1.

(Preparation of Silica-Attached (Coated with Silicon-Containing Hydrous Oxide) Titanium Dioxide Sol)

To 0.5 parts by mass of a sol containing 15.0% by mass of titanium oxide (SRD-W, volume average particle diameter of 5 nm, rutile type titanium dioxide particles, manufactured by Sakai Chemical Industry Co., Ltd.), 2 parts by mass of purified water was added and then heated to 90° C. Subsequently, 1.3 parts by mass of an aqueous silicic acid solution (obtained by diluting silicate soda No. 4 (manufactured by NIPPON CHEMICAL INDUSTRIAL CO., LTD.) with purified water so as to make a $SiO_2$ concentration be 2.0% by mass) was gradually added, then a heat treatment was carried out at 175° C. for 18 hours in an autoclave and, after cooling, the product was concentrated through an ultrafilter membrane to thus obtain a titanium dioxide sol with $SiO_2$ having a solid content concentration of 20% by mass attached to the surface (hereinafter, silica-attached titanium dioxide sol).

(Preparation of High Refractive Index Layer Coating Solution H2)

To 45 parts by mass of the above described silica-attached titanium dioxide sol (solid content of 20.0% by mass), 10 parts by mass of an aqueous solution containing 5% by mass of a polyoxyalkylene-based dispersing agent (Mariarim AKM-0531, manufactured by NOF Corporation), 10 parts by mass of an aqueous solution containing 3% by mass of boric acid, and 10 parts by mass of an aqueous solution containing 2% by mass of citric acid were sequentially added and then heated to 45° C., and with stirring, 20 parts by mass of an aqueous solution containing 5% by mass of polyvinyl alcohol (PVA-117, polymerization degree of 1700, degree of saponification of 98.5% by mol, manufactured by Kuraray Co., Ltd.) and 1 part by mass of an aqueous solution containing 1% by mass of a surfactant (Rapizol A30, manufactured by NOF CORPORATION) were added, and 4 parts by mass of purified water was added to thus prepare a high refractive index layer coating solution H2.

(Preparation of High Refractive Index Layer Coating Solution H3)

To 45 parts by mass of the above described silica-attached titanium dioxide sol (solid content of 20.0% by mass), 2 parts by mass of an aqueous solution containing 5% by mass of polyvinyl alcohol (PVA-103, polymerization degree of 300, degree of saponification of 98.5% by mol, manufactured by Kuraray Co., Ltd.), 10 parts by mass of an aqueous solution containing 3% by mass of boric acid, and 10 parts by mass of an aqueous solution containing 2% by mass of citric acid were respectively added and then heated to 45° C., and with stirring, 20 parts by mass of an aqueous solution containing 5% by mass of polyvinyl alcohol (PVA-117, polymerization degree of 1700, degree of saponification of 98.5% by mol, manufactured by Kuraray Co., Ltd.) and 1 part by mass of an aqueous solution containing 1% by mass of a surfactant (Rapizol A30, manufactured by NOF CORPORATION) were added, and 12 parts by mass of purified water was added to thus prepare a high refractive index layer coating solution H3.

(Preparation of High Refractive Index Layer Coating Solution H4)

To 40 parts by mass of the above described silica-attached titanium dioxide sol (solid content of 20.0% by mass), 2 parts by mass of an aqueous solution containing 5% by mass of polyvinyl alcohol (PVA-103, polymerization degree of 300, degree of saponification of 98.5% by mol, manufactured by Kuraray Co., Ltd.), 10 parts by mass of an aqueous solution containing 3% by mass of boric acid, and 10 parts by mass of an aqueous solution containing 2% by mass of citric acid were respectively added and then heated to 45° C., and with stirring, 20 parts by mass of an aqueous solution containing 5% by mass of polyvinyl alcohol (PVA-117, polymerization degree of 1700, degree of saponification of 98.5% by mol, manufactured by Kuraray Co., Ltd.) and 1 part by mass of an aqueous solution containing 1% by mass of a surfactant (Rapizol A30, manufactured by NOF CORPORATION) were added, and 17 parts by mass of purified water was added to thus prepare a high refractive index layer coating solution H4.

(Preparation of High Refractive Index Layer Coating Solution H5)

To 9 parts by mass of the above described silica-attached titanium dioxide sol (solid content of 20.0% by mass), 2 parts by mass of an aqueous solution containing 5% by mass of polyvinyl alcohol (PVA-103, polymerization degree of 300, degree of saponification of 98.5% by mol, manufactured by Kuraray Co., Ltd.), 10 parts by mass of an aqueous solution containing 3% by mass of boric acid, and 10 parts by mass of an aqueous solution containing 2% by mass of citric acid were respectively added and then heated to 45° C., and with stirring, 20 parts by mass of an aqueous solution containing 5% by mass of polyvinyl alcohol (PVA-117, polymerization degree of 1700, degree of saponification of 98.5% by mol, manufactured by Kuraray Co., Ltd.) and 1 part by mass of an aqueous solution containing 1% by mass of a surfactant (Rapizol A30, manufactured by NOF CORPORATION) were added, and 48 parts by mass of purified water was added to thus prepare a high refractive index layer coating solution H5.

(Preparation of High Refractive Index Layer Coating Solution H6)

To 30 parts by mass of the above described silica-attached titanium dioxide sol (solid content of 20.0% by mass), 2 parts by mass of an aqueous solution containing 5% by mass of polyvinyl alcohol (PVA-103, polymerization degree of 300, degree of saponification of 98.5% by mol, manufactured by Kuraray Co., Ltd.), 10 parts by mass of an aqueous solution containing 3% by mass of boric acid, and 10 parts by mass of an aqueous solution containing 2% by mass of citric acid were respectively added and then heated to 45° C., and with stirring, 20 parts by mass of an aqueous solution containing 5% by mass of polyvinyl alcohol (PVA-117, polymerization degree of 1700, degree of saponification of 98.5% by mol, manufactured by Kuraray Co., Ltd.) and 1 part by mass of an aqueous solution containing 1% by mass of a surfactant (Rapizol A30, manufactured by NOF CORPORATION) were added, and 27 parts by mass of purified water was added to thus prepare a high refractive index layer coating solution H6.

(Preparation of High Refractive Index Layer Coating Solution H7)

A high refractive index layer coating solution H7 was prepared in the same manner as the high refractive index layer coating solution H6, except for using an aqueous solution containing 5% by mass of polyvinyl alcohol (PVA-417, polymerization degree of 1700, degree of saponification of 79.5% by mol, manufactured by Kuraray Co., Ltd.) in place of the aqueous solution containing 5% by mass of polyvinyl alcohol (PVA-117, polymerization degree of 1700, degree of saponification of 98.5% by mol, manufactured by Kuraray Co., Ltd.).

(Preparation of High Refractive Index Layer Coating Solution H8)

A high refractive index layer coating solution H8 was prepared in the same manner as the high refractive index layer coating solution H6, except for using an aqueous solution containing 5% by mass of polyvinyl alcohol (PVA-617, polymerization degree of 1700, degree of saponification of 95.0% by mol, manufactured by Kuraray Co., Ltd.) in place of the aqueous solution containing 5% by mass of polyvinyl alcohol (PVA-117, polymerization degree of 1700, degree of saponification of 98.5% by mol, manufactured by Kuraray Co., Ltd.).

(Preparation of High Refractive Index Layer Coating Solution H9)

A high refractive index layer coating solution H9 was prepared in the same manner as the high refractive index layer coating solution H6, except for using an aqueous solution containing 5% by mass of polyvinyl alcohol (PVA-245, polymerization degree of 4500, degree of saponification of 88.0% by mol, manufactured by Kuraray Co., Ltd.) in place of the aqueous solution containing 5% by mass of polyvinyl alcohol (PVA-117, polymerization degree of 1700, degree of saponification of 98.5% by mol, manufactured by Kuraray Co., Ltd.).

(Preparation of High Refractive Index Layer Coating Solution H10)

A high refractive index layer coating solution H10 was prepared in the same manner as the high refractive index layer coating solution H6, except for using a 4:1 mixed solution of an aqueous solution containing 5% by mass of polyvinyl alcohol (PVA-124, polymerization degree of 2400, degree of saponification of 98.5% by mol, manufactured by Kuraray Co., Ltd.) and an aqueous solution containing 5% by mass of modified polyvinyl alcohol (Z-200, polymerization degree of 1100, degree of saponification of 99.0% by mol, manufactured by The Nippon Synthetic Chemical Co., Ltd.) in place of the aqueous solution containing 5% by mass of polyvinyl alcohol (PVA-117, polymerization degree of 1700, degree of saponification of 98.5% by mol, manufactured by Kuraray Co., Ltd.).

(Preparation of High Refractive Index Layer Coating Solution H11)

A high refractive index layer coating solution H11 was prepared in the same manner as the high refractive index layer coating solution H6, except for using an aqueous solution containing 5% by mass of polyvinyl alcohol (PVA-217, polymerization degree of 1700, degree of saponification of 88.0% by mol, manufactured by Kuraray Co., Ltd.) in place of the aqueous solution containing 5% by mass of polyvinyl alcohol (PVA-117, polymerization degree of 1700, degree of saponification of 98.5% by mol, manufactured by Kuraray Co., Ltd.).

(Preparation of High Refractive Index Layer Coating Solution H12)

A high refractive index layer coating solution H12 was prepared in the same manner as the high refractive index layer coating solution H6, except for using an aqueous solution containing 5% by mass of polyvinyl alcohol (PVA-120, polymerization degree of 2000, degree of saponification of 98.5% by mol, manufactured by Kuraray Co., Ltd.) in place of the aqueous solution containing 5% by mass of polyvinyl alcohol (PVA-117, polymerization degree of 1700, degree of saponification of 98.5% by mol, manufactured by Kuraray Co., Ltd.).

(Preparation of High Refractive Index Layer Coating Solution H13)

A high refractive index layer coating solution H13 was prepared in the same manner as the high refractive index layer coating solution H6, except for using an aqueous solution containing 5% by mass of polyvinyl alcohol (PVA-124, polymerization degree of 2400, degree of saponification of 98.5% by mol, manufactured by Kuraray Co., Ltd.) in place of the aqueous solution containing 5% by mass of polyvinyl alcohol (PVA-117, polymerization degree of 1700, degree of saponification of 98.5% by mol, manufactured by Kuraray Co., Ltd.).

(Preparation of High Refractive Index Layer Coating Solution H14)

A high refractive index layer coating solution H14 was prepared in the same manner as the high refractive index layer coating solution H6, except for using 20 parts by weight of an aqueous solution containing 5% by mass of polyvinyl alcohol (PVA-245, polymerization degree of 4500, degree of saponification of 88.0% by mol, manufactured by Kuraray Co., Ltd.) in place of 20 parts by mass of the aqueous solution containing 5% by mass of polyvinyl alcohol (PVA-117, polymerization degree of 1700, a degree of saponification of 98.5% by mol, manufactured by Kuraray Co., Ltd.) and further adding 5 parts by mass of an aqueous solution containing 5% by mass of polyvinyl alcohol (PVA-124, polymerization degree of 2400, degree of saponification of 98.5% bymol, manufactured by Kuraray Co., Ltd.).

(Preparation of High Refractive Index Layer Coating Solution H15)

A high refractive index layer coating solution H15 was prepared in the same manner as the high refractive index layer coating solution H6, except for using 10 parts by mass of an aqueous solution containing 5% by mass of polyvinyl alcohol (PVA-117H, polymerization degree of 1700, degree of saponification of 99.5% by mol, manufactured by Kuraray Co., Ltd.) and 10 parts by mass of an aqueous solution containing 5% by mass of polyvinyl alcohol (PVA-124, polymerization degree of 2400, degree of saponification of 98.5% by mol, manufactured by Kuraray Co., Ltd.) in place of 20 parts by mass of the aqueous solution containing 5% by mass of polyvinyl alcohol (PVA-117, polymerization degree of 1700, degree of saponification of 98.5% by mol, manufactured by Kuraray Co., Ltd.). Herein, PVA-117H and PVA-124 have the same degree of saponification and are therefore regarded as identical polyvinyl alcohols, and the degree of saponification is 99.0% by mol=(0.05*0.1*99.5+0.05*0.1*98.5)/(0.05*0.1+0.05*0.1) and the polymerization degree is 2050=(1700*0.1+2400*0.1)/0.2 in this case.

(Preparation of High Refractive Index Layer Coating Solution H16)

A high refractive index layer coating solution H16 was prepared in the same manner as the high refractive index layer coating solution H13 except for using a zirconia particle aqueous sol (volume average particle diameter of 6 nm, NanoUse ZR-30BF; manufactured by Nissan Chemical Industries, Ltd.) in place of the silica-attached titanium dioxide sol (solid content of 20% by mass).

[Preparation of Optical Reflective Film]

(Preparation of Sample 1)

Simultaneous multilayer coating of the low refractive index layer coating solution L1 and the high refractive index layer coating solution H1 was performed on a 50 μm-thickness polyethylene terephthalate film (A4300 manufactured by TOYOBO CO., LTD.: double-sided easily adhesive layer) warmed at 45° C. while keeping the coating solutions at 45° C., using a slide hopper coating device capable of multilayer coating of 9 layers, such that total 9 layers were alternately coated to have a film thickness at the time of dry of each low refractive index layer of 150 nm and each high refractive index layer of 150 nm.

Immediately after coating, cool air at 5° C. was blown for 5 minutes, then warm air at 80° C. was blown to dry, and a sample 1 made of 9 layers was thus prepared.

(Preparation of Sample 2)

A sample 1 was prepared in the same manner as the sample 2 except for using the low refractive index layer coating solution L15 in place of the low refractive index layer coating solution L1.

<<Evaluation>>

The elemental measurement was carried out on the cross-sectional surface of the films prepared above by an energy dispersive X-ray fluorescence spectrometer and distribution of existence of boron was observed, and it was found that distribution of existence of the boron element between the low refractive index layer and the high refractive index layer was more favorably separated in the sample 1, as compared to in the sample 2.

(Preparation of Sample 3)

Coating of the low refractive index layer coating solution L2 warmed at 45° C. was performed on a glass substrate (6 cm-square, 3 mm-thickness) under the condition of 1000 rpm for 300 seconds, using a spin coater. Continuously on this, coating of the high refractive index layer coating solution H2 warmed at 45° C. was performed under the condition of 1000 rpm for 300 seconds, using a spin coater. Further on this, coating of the low refractive index layer coating solution L2 warmed at 45° C. was performed under the condition of 1000 rpm for 300 seconds, using a spin coater, hot air at 80° C. was blown to dry, and a sample 3 made of 3 layers was thus prepared.

(Preparation of Sample 4)

A sample 4 was prepared in the same manner as the sample 3, except for using the low refractive index layer coating solution L16 in place of the low refractive index layer coating solution L2.

<<Evaluation>>

The elemental measurement was carried out on the cross-sectional surface of the films prepared above by an energy dispersive X-ray fluorescence spectrometer and distribution of existence of silicon and titanium was observed, and it was found that distribution of existence of silicon and titanium between the low refractive index layer and the high refractive index layer was more favorably separated in the sample 3, as compared to in the sample 4.

(Preparation of Sample 5)

Simultaneous multilayer coating of the low refractive index layer coating solution L2 and the high refractive index layer coating solution H2 was performed on a 50 μm-thickness polyethylene terephthalate film (A4300 manufactured by TOYOBO CO., LTD.: double-sided easily adhesive layer) warmed at 45° C. while keeping the coating solutions at 45° C., using a slide hopper coating device capable of multilayer coating of 9 layers, such that total 9 layers were alternately coated to have a film thickness at the time of dry of each low refractive index layer of 150 nm and each high refractive index layer of 150 nm.

Immediately after coating, cool air at 5° C. was blown for 5 minutes, then warm air at 80° C. was blown to dry, and a multilayer coated article made of 9 layers was prepared.

Multilayer coating of 9 layers was further performed twice on the above described multilayer coated article of 9 layers to thus prepare a sample 5 made of total 27 layers.

(Preparation of Samples 6 to 27 and 29 to 32)

Each of samples 6 to 27 and 29 to 32 was prepared in the same method as the sample 5, using the combinations of low refractive index layer coating solutions and high refractive index layer coating solutions described in Table 1 as a low refractive index layer coating solution and a high refractive index layer coating solution.

(Preparation of Sample 28)

A multilayer coated article of 9 layers was prepared in the same method as the sample 5, using the high refractive index layer coating solution H13 and the low refractive index layer coating solution L11 used in the sample 22. Multilayer coating of 9 layers was further performed on the above described multilayer coated article of 9 layers to prepare a multilayer coated article of total 18 layers. Then, simultaneous multilayer coating of total 9 layers was repeated twice on the opposite side of the polyethylene terephthalate film such that the 9 layers were alternately coated to have a film thickness at the time of dry of each low refractive index layer of 165 nm and each high refractive index layer of 165 nm, and a sample 28 having total 36 layers on the both sides together was prepared.

<<Evaluation of Near-Infrared Shielding Film>>

The following performance evaluations were carried out on each of the near-infrared shielding films (the samples 5 to 32) prepared above.

(Measurement of Single Film Refractive Index of Each Layer)

A sample obtained by performing coating of each target layer in monolayer, of which refractive index is to be measured (high refractive index layer, low refractive index layer) on a substrate was prepared and the refractive index of each of a high refractive index layer and a low refractive index layer was determined according to the method described below.

A surface roughening treatment was carried out on a back side serving as a measurement side of each sample by using U-4000 type (manufactured by Hitachi, Ltd.) as a spectrophotometer, a light absorbing treatment was then carried out with a black spray to prevent light reflection in the back side and a reflectivity in a visible light region (400 nm to 700 nm) was measured in a condition of 5 degrees of regular reflection, and as a result, the refractive index was determined.

As a result of measuring a refractive index of each layer according to the above described method, it was confirmed that a difference in refractive index between the high refractive index layer and the low refractive index layer was 0.1 or more in samples 5 to 32.

(Evaluation of Interlaminar Separation Property)

The elemental measurement was carried out on the cross-sectional surface of each infrared shielding film prepared above by an energy dispersive X-ray fluorescence spectrometer and distribution of existence of silicon and titanium was observed and evaluation of interlaminar separation property at the time of coating was carried out in accordance with the following criteria.

⊙: Distribution of existence of silicon and titanium is clearly separated between a low refractive index layer and a high refractive index layer, interlaminar disorder is not observed at all, and interlaminar uniformity is extremely favorable;

○: Distribution of existence of silicon and titanium is separated between a low refractive index layer and a high refractive index layer, interlaminar disorder is hardly observed, and interlaminar uniformity is comparatively favorable;

Δ: Mixing and weak disorder of distribution of existence of silicon and titanium are observed between a low refractive index layer and a high refractive index layer, but interlaminar properties are favorable on the whole; and x: Strong disorder of distribution of existence of silicon and titanium is observed between a low refractive index layer and a high refractive index layer and an interlaminar separation property is poor.

(Measurements of Visible Light Transmission and Near-Infrared Transmission)

Using the above described spectrophotometer (use of integrating sphere, manufactured by Hitachi, Ltd., U-4000 type), a transmission of the near-infrared shielding film sample in the region from 300 nm to 2000 nm was measured. A value of a transmission at 550 nm was used as a visible light transmission and a value of a transmission at 1200 nm was used as a near-infrared transmission.

Compositions of respective samples and evaluation results are shown in Table 1.

TABLE 1

| | High refractive index layers | | | | | | |
|---|---|---|---|---|---|---|---|
| Sample No. | High refractive index layer coating solution | Degree of saponification of polyvinyl alcohol (A) (% by mol) | Polymerization degree of polyvinyl alcohol (A) | Content of polyvinyl alcohol (A) in high refractive index layer (% by mass) | High-saponified polyvinyl alcohol other than polyvinyl alcohol (A) | Low-polymerized and high-saponified polyvinyl alcohol | Remarks |
| Sample 5 | H2 | 98.5 | 1700 | 9.1 | X | X | The present invention |
| Sample 6 | H3 | 98.5 | 1700 | 9.4 | X | ○ | The present invention |
| Sample 7 | H4 | 99.5 | 1700 | 10.4 | X | ○ | The present invention |
| Sample 8 | H5 | 98.5 | 1700 | 29.3 | X | ○ | The present invention |
| Sample 9 | H6 | 98.5 | 1700 | 13.0 | X | ○ | The present invention |
| Sample 10 | H7 | 79.5 | 1700 | 13.0 | X | ○ | The present invention |
| Sample 11 | H8 | 95.0 | 1700 | 13.0 | X | ○ | The present invention |
| Sample 12 | H6 | 98.5 | 1700 | 13.0 | X | ○ | The present invention |
| Sample 13 | H6 | 98.5 | 1700 | 13.0 | X | ○ | The present invention |
| Sample 14 | H12 | 98.5 | 2000 | 13.0 | X | ○ | The present invention |
| Sample 15 | H13 | 98.5 | 2400 | 13.0 | X | ○ | The present invention |
| Sample 16 | H9 | 88.0 | 4500 | 13.0 | X | ○ | The present invention |
| Sample 17 | H6 | 98.5 | 1700 | 13.0 | X | ○ | The present invention |
| Sample 18 | H6 | 98.5 | 1700 | 13.0 | X | ○ | The present invention |
| Sample 19 | H6 | 98.5 | 1700 | 13.0 | X | ○ | The present invention |
| Sample 20 | H12 | 98.5 | 2000 | 13.0 | X | ○ | The present invention |
| Sample 21 | H13 | 98.5 | 2400 | 13.0 | X | ○ | The present invention |
| Sample 22 | H13 | 98.5 | 2400 | 13.0 | X | ○ | The present invention |
| Sample 23 | H10 | 98.5 | 2400 | 10.4 | X | ○ | The present invention |
| Sample 24 | H6 | 98.5 | 1700 | 13.0 | X | ○ | Comparative Example |
| Sample 25 | H11 | 88.0 | 1700 | 13.0 | X | ○ | Comparative Example |
| Sample 26 | H13 | 98.5 | 2400 | 13.0 | X | ○ | The present invention |
| Sample 27 | H14 | 88.0 | 4500 | 12.7 | ○ | ○ | The present invention |
| Sample 28 | H13 | 98.5 | 2400 | 13.0 | ○ | ○ | The present invention |
| Sample 29 | H15 | 99.0 | 2050 | 13.0 | ○ | ○ | The present invention |
| Sample 30 | H13 | 98.5 | 2400 | 13.0 | ○ | ○ | The present invention |
| Sample 31 | H15 | 99.0 | 2050 | 13.0 | ○ | ○ | The present invention |
| Sample 32 | H16 | 98.5 | 2400 | 13.0 | ○ | ○ | The present invention |

| | Low refractive index layers | | | | | | |
|---|---|---|---|---|---|---|---|
| Sample No. | Low refractive index layer coating solution | Degree of saponification of polyvinyl alcohol (B) (% by mol) | Polymerization degree of polyvinyl alcohol (B) | Content of polyvinyl alcohol (B) in high refractive index layer (% by mass) | High-saponified polyvinyl alcohol other than polyvinyl alcohol (B) | Low-polymerized and high-saponified polyvinyl alcohol | Remarks |
| Sample 5 | L2 | 99.5 | 1700 | 13.7 | X | X | The present invention |
| Sample 6 | L3 | 99.5 | 1700 | 14.5 | X | ○ | The present invention |
| Sample 7 | L4 | 98.5 | 1700 | 18.5 | X | ○ | The present invention |
| Sample 8 | L5 | 99.5 | 1700 | 38.3 | X | ○ | The present invention |
| Sample 9 | L6 | 95.0 | 1700 | 18.5 | X | ○ | The present invention |
| Sample 10 | L7 | 88.0 | 1700 | 18.5 | X | ○ | The present invention |
| Sample 11 | L7 | 88.0 | 1700 | 18.5 | X | ○ | The present invention |

TABLE 1-continued

| Sample | | | | | | | | |
|---|---|---|---|---|---|---|---|---|
| Sample 12 | L7 | 88.0 | 1700 | 18.5 | X | ○ | The present invention |
| Sample 13 | L8 | 79.5 | 1700 | 18.5 | X | ○ | The present invention |
| Sample 14 | L7 | 88.0 | 1700 | 18.5 | X | ○ | The present invention |
| Sample 15 | L7 | 88.0 | 1700 | 18.5 | X | ○ | The present invention |
| Sample 16 | L9 | 98.5 | 1700 | 18.5 | X | ○ | The present invention |
| Sample 17 | L10 | 88.0 | 2000 | 18.5 | X | ○ | The present invention |
| Sample 18 | L11 | 88.0 | 4500 | 18.5 | X | ○ | The present invention |
| Sample 19 | L12 | 79.5 | 2000 | 18.5 | X | ○ | The present invention |
| Sample 20 | L10 | 88.0 | 2000 | 18.5 | X | ○ | The present invention |
| Sample 21 | L13 | 88.0 | 3500 | 18.5 | X | ○ | The present invention |
| Sample 22 | L11 | 88.0 | 4500 | 18.5 | X | ○ | The present invention |
| Sample 23 | L14 | 88.0 | 4500 | 14.8 | X | ○ | The present invention |
| Sample 24 | L9 | 98.5 | 1700 | 18.5 | X | ○ | Comparative Example |
| Sample 25 | L7 | 88.0 | 1700 | 18.5 | X | ○ | Comparative Example |
| Sample 26 | L17 | 79.5 | 2000 | 17.7 | ○ | ○ | The present invention |
| Sample 27 | L17 | 79.5 | 2000 | 17.7 | ○ | ○ | The present invention |
| Sample 28 | L11 | 88.0 | 4500 | 18.5 | X | ○ | The present invention |
| Sample 29 | L11 | 88.0 | 4500 | 18.5 | ○ | ○ | The present invention |
| Sample 30 | L18 | 88.0 | 4200 | 18.5 | ○ | ○ | The present invention |
| Sample 31 | L18 | 88.0 | 4200 | 18.5 | ○ | ○ | The present invention |
| Sample 32 | L11 | 88.0 | 4500 | 18.5 | ○ | ○ | The present invention |

TABLE 2

| Sample No. | Difference in degrees of saponification between polyvinyl alcohol (A) and polyvinyl alcohol (B) (% by mol) | Interlayer separation property | Visible light transmission (%) | Near-infrared transmission (%) | Remarks |
|---|---|---|---|---|---|
| Sample 5 | 1.0 | Δ | 71 | 28 | The present invention |
| Sample 6 | 1.0 | Δ | 73 | 26 | The present invention |
| Sample 7 | 1.0 | Δ | 74 | 26 | The present invention |
| Sample 8 | 1.0 | Δ | 75 | 27 | The present invention |
| Sample 9 | 3.5 | ○ | 75 | 25 | The present invention |
| Sample 10 | 8.5 | ○ | 74 | 26 | The present invention |
| Sample 11 | 7.0 | ○ | 76 | 23 | The present invention |
| Sample 12 | 10.5 | ○ | 75 | 23 | The present invention |
| Sample 13 | 19.0 | ○ | 76 | 23 | The present invention |
| Sample 14 | 10.5 | ○ | 77 | 18 | The present invention |
| Sample 15 | 10.5 | ○ | 78 | 17 | The present invention |
| Sample 16 | 10.5 | ○ | 78 | 16 | The present invention |
| Sample 17 | 10.5 | ◉ | 78 | 15 | The present invention |
| Sample 18 | 10.5 | ◉ | 79 | 13 | The present invention |
| Sample 19 | 19.0 | ◉ | 77 | 16 | The present invention |
| Sample 20 | 10.5 | ◉ | 79 | 11 | The present invention |
| Sample 21 | 10.5 | ◉ | 80 | 10 | The present invention |
| Sample 22 | 10.5 | ◉ | 81 | 8 | The present invention |
| Sample 23 | 10.5 | ◉ | 80 | 9 | The present invention |
| Sample 24 | 0 | X | 59 | 40 | Comparative Example |
| Sample 25 | 0 | X | 60 | 39 | Comparative Example |
| Sample 26 | 19.0 | ◉ | 81 | 7 | The present invention |
| Sample 27 | 8.5 | ◉ | 81 | 6 | The present invention |
| Sample 28 | 10.5 | ◉ | 80 | 6 | The present invention |
| Sample 29 | 11.1 | ◉ | 81 | 9 | The present invention |
| Sample 30 | 10.5 | ◉ | 81 | 9 | The present invention |
| Sample 31 | 11.1 | ◉ | 81 | 8 | The present invention |
| Sample 32 | 10.5 | ◉ | 78 | 13 | The present invention |

As apparent from the results of Table 1, it is found that the samples 5 to 23 and 26 to 32 that are the optical reflective films of the present invention have a favorable interlaminar separation property and are excellent in a near-infrared blocking property and visible light transmittance as compared to the optical reflective films of comparative examples.

Further, the samples 9 to 23 and 26 to 32, in which a difference in the degree of saponification between the polyvinyl alcohol (A) and the polyvinyl alcohol (B) is 3% by mol or more, are more improved in an interlaminar separation property. Furthermore, the samples 9, 11 to 23 and 26 to 32, in which a degree of saponification of a polyvinyl alcohol in one of the high refractive index layer and the low refractive index layer is 90% by mol or more and a degree of saponification of a polyvinyl alcohol in the other layer is lower than the degree of saponification of 90% by mol, were furthermore reduced in near-infrared transmissions. Further, the samples 14 to 23 and 26 to 32, in which a polymerization degree of at least one of the polyvinyl alcohol (A) and the polyvinyl alcohol (B) is 2000 to 5000, were furthermore reduced in near-infrared transmissions. The samples 17 to 23 and 26 to 32, in which a degree of saponification of the polyvinyl alcohol (B) is 75% by mol or more and 90% by mol or less and a polymerization degree is 2000 or more and 5000 or less, had further clearer interlaminar separation. Further, the optical films 20 to 23 and 26 to 32, in which polymerization degrees of both of the polyvinyl alcohol (A) and the polyvinyl alcohol (B) are 2000 to 5000, were furthermore reduced in near-infrared transmissions.

[Preparation of Near-Infrared Reflector]

Near-infrared reflectors 1 to 19 were prepared using optical reflective films of the optical reflective films 5 to 23 and 26 to 32 prepared above. Each of the optical reflective films 5 to 23 and 26 to 32 was caused to adhere onto a transparent acrylic resin plate having a thickness of 5 mm and a size of 20 cm×20 cm with an acrylic adhesive agent to prepare each of optical reflectors 1 to 26.

[Evaluations]

The optical reflectors 1 to 26 prepared above were easily utilizable despite large sizes and were also confirmed to have excellent light reflecting properties due to utilizing the optical reflective film of the present invention.

The present application is based on Japanese Patent Application No. 2011-239568 filed on Oct. 31, 2011, and its disclosure is incorporated herein by reference in its entirety.

What is claimed is:

1. An optical reflective film comprising at least one unit obtained by laminating a high refractive index layer and a low refractive index layer on a substrate, wherein
the high refractive index layer and the low refractive index layer each contain at least one kind of polyvinyl alcohol, and
when a polyvinyl alcohol having the highest content in the high refractive index layer is referred to as a "polyvinyl alcohol (A)" and a polyvinyl alcohol having the highest content in the low refractive index layer is referred to as a "polyvinyl alcohol (B)", a degree of saponification of the polyvinyl alcohol (A) is different from a degree of saponification of the polyvinyl alcohol (B).

2. The optical reflective film according to claim 1, wherein at least one of the high refractive index layer and the low refractive index layer further contains a metal oxide particle and a difference in refractive index between the high refractive index layer and the low refractive index layer is 0.1 or more.

3. The optical reflective film according to claim 1, wherein a difference in the degree of saponification between the polyvinyl alcohol (A) and the polyvinyl alcohol (B) is 3% by mol or more.

4. The optical reflective film according to claim 1, wherein a degree of saponification of one of the polyvinyl alcohol (A) and the polyvinyl alcohol (B) is 90% by mol or more and the other polyvinyl alcohol has a degree of saponification lower than the degree of saponification of the polyvinyl alcohol of 90% by mol or more.

5. The optical reflective film according to claim 1, wherein at least one of the polyvinyl alcohol (A) and the polyvinyl alcohol (B) has a polymerization degree of 2000 or more and 5000 or less.

6. The optical reflective film according to claim 1, wherein the polyvinyl alcohol (B) has a degree of saponification of 75% by mol or more and 90% by mol or less and a polymerization degree of 2000 or more and 5000 or less.

7. The optical reflective film according to claim 1, wherein both of the polyvinyl alcohol (A) and the polyvinyl alcohol (B) each have a polymerization degree of 2000 or more and 5000 or less.

8. The optical reflective film according to claim 1, wherein at least one of the high refractive index layer and the low refractive index layer contains a low-polymerized and high-saponified polyvinyl alcohol having a polymerization degree of 100 or more and 1000 or less and a degree of saponification of 95% by mol or more.

9. The optical reflective film according to claim 1, further comprising a polyvinyl alcohol having a degree of saponification of 90% by mol or more other than the polyvinyl alcohol (A) and the polyvinyl alcohol (B) in either of the high refractive index layer or the low refractive index layer.

10. The optical reflective film according to claim 9, further comprising a polyvinyl alcohol having a degree of saponification of 90% by mol or more in both the high refractive index layer and the low refractive index layer.

11. The optical reflective film according to claim 1, wherein at least one of the high refractive index layer and the low refractive index layer further contains a modified polyvinyl alcohol.

12. The optical reflective film according to claim 1, wherein a content of the polyvinyl alcohol (A) is 10% by mass or more of the total solid content of the high refractive index layer and a content of the polyvinyl alcohol (B) is 10% by mass or more of the total solid content of the low refractive index layer.

13. The optical reflective film according to claim 1 produced by simultaneous multilayer coating.

14. An optical reflector provided with the optical reflective film according to claim 1 on at least one side of a base structure.

15. A method of producing the optical reflective film according to claim 1,
comprising a step of performing simultaneous multilayer coating of a high refractive index layer coating solution and a low refractive index layer coating solution on a substrate and then drying to form an optical reflective film comprising a high refractive index layer and a low refractive index layer.

16. The optical reflective film according to claim 2, wherein a difference in the degree of saponification between the polyvinyl alcohol (A) and the polyvinyl alcohol (B) is 3% by mol or more.

17. The optical reflective film according to claim 16, wherein a degree of saponification of one of the polyvinyl alcohol (A) and the polyvinyl alcohol (B) is 90% by mol or more and the other polyvinyl alcohol has a degree of saponification lower than the degree of saponification of the polyvinyl alcohol of 90% by mol or more.

18. The optical reflective film according to claim 17, wherein at least one of the polyvinyl alcohol (A) and the polyvinyl alcohol (B) has a polymerization degree of 2000 or more and 5000 or less.

19. The optical reflective film according to claim 18, wherein at least one of the high refractive index layer and the low refractive index layer contains a low-polymerized and high-saponified polyvinyl alcohol having a polymerization degree of 100 or more and 1000 or less and a degree of saponification of 95% by mol or more.

20. The optical reflective film according to claim 19, wherein at least one of the high refractive index layer and the low refractive index layer further contains a modified polyvinyl alcohol.

* * * * *